US012059893B2

(12) United States Patent
Jackson et al.

(10) Patent No.: US 12,059,893 B2

(45) Date of Patent: Aug. 13, 2024

(54) PIEZOELECTRIC DROPLET DEPOSITION APPARATUS OPTIMISED FOR HIGH VISCOSITY FLUIDS, AND METHODS AND CONTROL SYSTEM THEREFOR

(71) Applicant: Xaar Technology Limited, Huntingdon (GB)

(72) Inventors: Nicholas Marc Jackson, Huntingdon (GB); Angus Condie, Huntingdon (GB); Wolfgang Voit, Huntingdon (GB); Andrew Cox, Huntingdon (GB); Michael Reddish, Huntingdon (GB)

(73) Assignee: Xaar Technology Limited, Huntingdon (GB)

( * ) Notice: Subject to any disclaimer, the term of this patent is extended or adjusted under 35 U.S.C. 154(b) by 181 days.

(21) Appl. No.: 17/612,960

(22) PCT Filed: May 20, 2020

(86) PCT No.: PCT/GB2020/051234

§ 371 (c)(1),
(2) Date: Nov. 19, 2021

(87) PCT Pub. No.: WO2020/234592

PCT Pub. Date: Nov. 26, 2020

(65) Prior Publication Data

US 2022/0339931 A1 Oct. 27, 2022

(30) Foreign Application Priority Data

May 21, 2019 (GB) ..................................... 1907185

(51) Int. Cl.

*B41J 2/045* (2006.01)
*B41J 2/14* (2006.01)

(52) U.S. Cl.

CPC ....... *B41J 2/04541* (2013.01); *B41J 2/04563* (2013.01); *B41J 2/04581* (2013.01)

(58) Field of Classification Search

CPC ..................................................... B41J 2/14209

See application file for complete search history.

(56) References Cited

U.S. PATENT DOCUMENTS 7,845,784 B2 * 12/2010 Nitta .................... B41J 2/17596 347/89

8,696,092 B2 4/2014 Gao et al.

(Continued)

FOREIGN PATENT DOCUMENTS

CN 106956509 A 7/2017
EP 2821229 A1 1/2015

(Continued)

OTHER PUBLICATIONS

Machine generated English translation of JP2004009582A to Asano et al., "Method of Inkjet Recording"; retrieved via FIT database on Jul. 27, 2023; 34pp.*

(Continued)

*Primary Examiner* — Shelby L Fidler

(74) *Attorney, Agent, or Firm* — Honigman LLP; Eric J. Sosenko; Jonathan P. O'Brien

(57) ABSTRACT

A droplet deposition apparatus comprising a droplet deposition head, a fluid supply and a controller, wherein: the droplet deposition head comprises one or more fluid chambers each having a nozzle, a fluid inlet path having a fluid inlet into the head, and ending in the one or more nozzles, and a fluid return path starting at the one or more nozzles and ending in a fluid return of the head; each fluid chamber comprises two opposing chamber walls comprising piezoelectric material and deformable upon application of an electric drive signal so as to eject a fluid droplet from the nozzle; the fluid supply is configured to supply a fluid to the (Continued)

fluid inlet at a differential pressure as measured between the fluid inlet and the fluid return; and the controller is configured to apply a drive signal to the piezoelectric chamber walls such that the nozzle or nozzles deposit droplets of a fluid having a viscosity in the range from 45 mPa·s to 130 mPa·s at a jetting temperature between 20° C. and 90° C., and wherein the differential pressure applied by the fluid supply causes a fluid return flow into the fluid return at a rate of between 50 ml/min and 200 ml/min. A method of operating the droplet deposition apparatus, and a control system for carrying out the method, are also provided.

23 Claims, 8 Drawing Sheets

(56) References Cited

U.S. PATENT DOCUMENTS

| | | | | |
|---|---|---|---|---|
| 2006/0012624 | A1* | 1/2006 | Vanhooydonck | B41J 2/2054 347/15 |
| 2006/0033768 | A1* | 2/2006 | Uraki | B41J 2/0456 347/14 |
| 2006/0152541 | A1 | 7/2006 | Isozaki et al. | |
| 2007/0296753 | A1* | 12/2007 | Ito | B41J 2/04555 347/19 |
| 2010/0165020 | A1 | 7/2010 | Tojo et al. | |
| 2010/0302301 | A1* | 12/2010 | Oikawa | B41J 29/38 347/17 |
| 2011/0080456 | A1 | 4/2011 | Shibata et al. | |
| 2017/0282555 | A1 | 10/2017 | DeMeutter et al. | |
| 2018/0215168 | A1* | 8/2018 | Nabeshima | B41J 2/14032 |
| 2018/0272709 | A1* | 9/2018 | Iwata | B41J 2/04541 |
| 2019/0002719 | A1* | 1/2019 | Pousthomis | C09K 11/703 |
| 2019/0030904 | A1 | 1/2019 | Katakura et al. | |

FOREIGN PATENT DOCUMENTS

| | | | | | |
|---|---|---|---|---|---|
| EP | 3000602 | A1 | | 9/2016 | |
| EP | 3330329 | A2 | | 6/2018 | |
| GB | 2563235 | A | | 12/2018 | |
| JP | 2003-191468 | A | | 7/2003 | |
| JP | 2003-311945 | A | | 11/2003 | |
| JP | 2004009582 | A | * | 1/2004 | B41J 2/14209 |
| JP | 2006-051708 | A | | 2/2006 | |
| JP | 2008-149594 | A | | 7/2008 | |
| JP | 2008-162162 | A | | 7/2008 | |
| JP | 2010-155928 | A | | 7/2010 | |
| JP | 2018-089957 | A | | 6/2018 | |
| WO | 2006/075477 | A1 | | 7/2006 | |
| WO | 2010/0055345 | A1 | | 5/2010 | |
| WO | 2012/098580 | A1 | | 6/2014 | |

OTHER PUBLICATIONS

Derby, Brian: "Inkjet Printing of Functional and Structural Materials: Fluid Property Requirements, Feature Stability, and Resolution", Annual Review of Materials, Mar. 9, 2010.

* cited by examiner

PIEZOELECTRIC DROPLET DEPOSITION APPARATUS OPTIMISED FOR HIGH VISCOSITY FLUIDS, AND METHODS AND CONTROL SYSTEM THEREFOR

CROSS REFERENCE TO RELATED APPLICATIONS

This application is the U.S. national phase of PCT Application No. PCT/GB2020/051234, filed on May 20, 2020, which claims priority to GB 1907185.1 filed May 21, 2019, the disclosures of which are herein incorporated by reference in their entirety.

FIELD OF THE INVENTION

Field of Invention

The present disclosure relates to a piezoelectric droplet deposition apparatus suitable for printing high viscosity fluids, a method of operating the apparatus and a control system therefor. The droplet deposition apparatus may be used with particular benefit in applications such as 3D printing and photopolymer jetting which require high molecular weight polymeric component fluids.

BACKGROUND

The inkjet industry is constantly evolving to cater to the needs of new and challenging applications, requiring new capabilities such as increased productivity and reduced cost.

It has been a long established principle that piezoelectric inkjet printheads are limited to depositing droplets of fluid having a viscosity below 30 mPa·s (Ohnesorge number Oh<1) due to the fluid resistance of flow through the nozzle, resulting in excessive drive voltage requirements or ink starvation from the inability to replenish the ink channel. This restricts the capability to print mechanically tough and flexible parts which require fluids such as resins that include high molecular weight polymer chains and have a viscosity far higher than conventional inkjet fluids.

SUMMARY

Aspects of the invention are set out in the appended independent claims, while particular implementations of the invention are set out in the appended dependent claims.

The following disclosure describes, in one aspect, a droplet deposition apparatus comprising a droplet deposition head, a fluid supply and a controller; wherein: the droplet deposition head comprises one or more fluid chambers each having a nozzle, a fluid inlet path having a fluid inlet into the head, and ending in the one or more nozzles, and a fluid return path starting at the one or more nozzles and ending in a fluid return of the head; each fluid chamber comprises two opposing chamber walls comprising piezoelectric material and deformable upon application of an electric drive signal so as to eject a fluid droplet from the nozzle; the fluid supply is configured to supply a fluid to the fluid inlet at a differential pressure as measured between the fluid inlet and the fluid return; and the controller is configured to apply a drive signal to the piezoelectric chamber walls such that the nozzle or nozzles deposit droplets of a fluid having a viscosity in the range from 45 mPa·s to 130 mPa·s at a jetting temperature between 20° C. and 90° C., and wherein the differential pressure applied by the fluid supply causes a fluid return flow into the fluid return at a rate of between 50 ml/min and 200 ml/min.

A method of operating the droplet deposition apparatus, and a control system for carrying out the method are also provided.

BRIEF DESCRIPTION OF THE DRAWINGS

Reference is now directed to the drawings, in which.

In the Figures, like elements are indicated by like reference numerals throughout.

DETAILED DESCRIPTION

The functionality of the embodiments and their various implementations will now be described with respect to FIGS. 1-14.

The inventors have surprisingly found it possible, against expectations, to jet high viscosity fluids with certain types of piezoelectric inkjet printheads, provided certain specific conditions and combinations are employed. This allows stable ejection of fluids of high viscosity with Ohnesorge numbers greater than 1.

It was found that, contrary to expectations, a printhead may be designed with fluid recirculation past the nozzles having a differential pressure between its fluid inlet and fluid return and having a fluid resistance that is low enough to allow jetting of high viscosity fluids. In such printheads, it was found that recirculation past the nozzle allows sufficiently high fluid flow rates that ensure a constant supply of fluid to the pressure chamber and continuous nozzle replenishment, refilling the nozzle faster than viscous flow alone. The printheads tested have pressure chambers in which opposing chamber walls are comprised of piezoelectric material and these active walls are able to deform upon application of a voltage signal. Each wall is also an active wall for the neighbouring chamber, meaning each wall is shared between two chambers. The walls operate most efficiently in chevron shear-mode, and the printheads were found to be capable of jetting fluids with Ohnesorge numbers (Oh) greater than 1, and even greater than 2. In the printhead used to test the high viscosity fluids, pressure chambers are elongate and are open to the ink manifold at opposite ends, and opposing side walls deform to eject droplets in acoustic mode: two pressure pulses are generated from both ends of the chamber and they reinforce a droplet ejection pulse at the nozzle positioned at the centre of the chamber. This acoustic operation maximises the supply of fluid to the nozzle and minimises the energy required to eject a drop.

Figure 4:
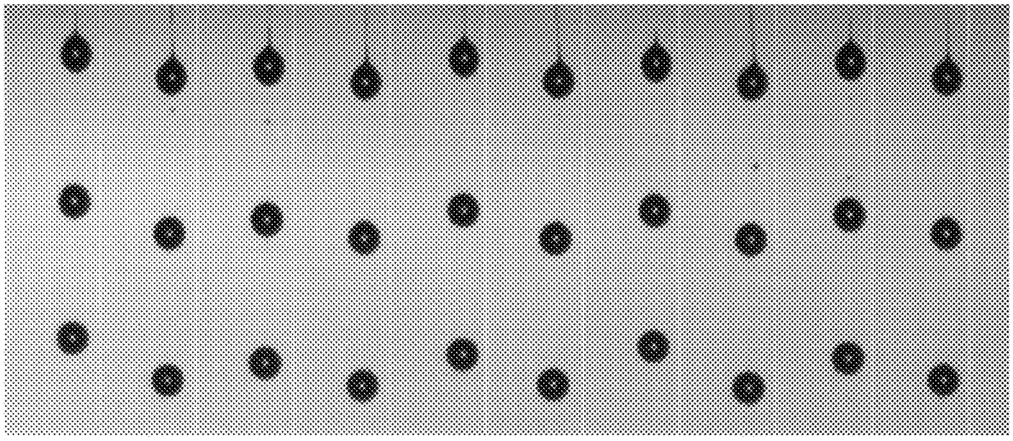
FIG. 4 is an image of droplets in flight for the first drive mode using a high viscosity fluid.

Additionally, a first drive mode was found to be particularly suited to jetting very high viscosity fluids. Using a near-resonant single-cycle operational "High Laydown (HL)" mode allowed jetting fluids in excess of 60 mPa·s and up to about 126 mPa·s, with Ohnesorge numbers Oh>2 as high as 2.5, while displaying stable drop formation with very little misting or satellites. In other examples, the "High Laydown (HL)" mode further allows jetting fluids up to about 130 mPa·s, with Ohnesorge numbers as high as 3 or as high as 4. Droplets imaged in flight for this mode of driving are shown in FIG. 4. Furthermore, this first mode of printing enables the piezoelectric printheads used for the tests described herein to print entire layers of photopolymer of a thickness of up to 80 μm in a single pass at 423 mm/s scanning speed.

Further still, by elevating the jetting temperature, which is the temperature of the fluid when it passes through the fluid chambers, it is possible to jet fluids with viscosities in excess of 600 mPa·s at 30° C. This enables printing of specifically formulated fluids to achieve improved mechanical toughness and flexibility at high resolution and high speed, as well as potentially enabling some existing stereolithography 3D printing resins to be printed with piezoelectric droplet deposition heads.

Fluid Parameters

Figure 1:
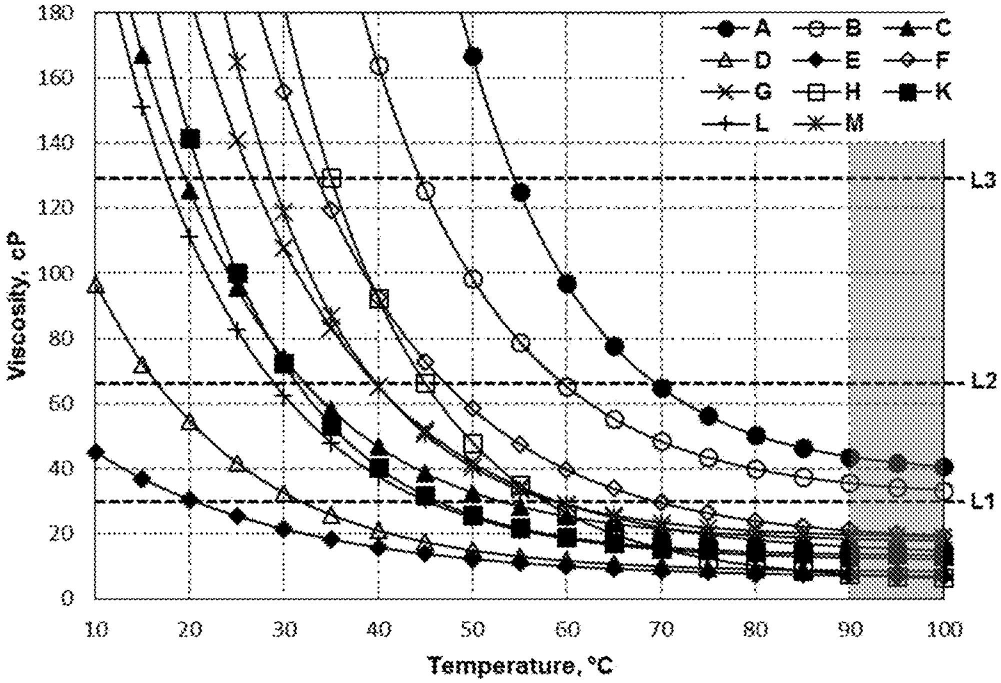
FIG. 1 is a plot of viscosity against temperature for standard fluids D and E, development fluids A, B, C, F, G and K, and commercially available fluids like H, L and M.
Figure 2:
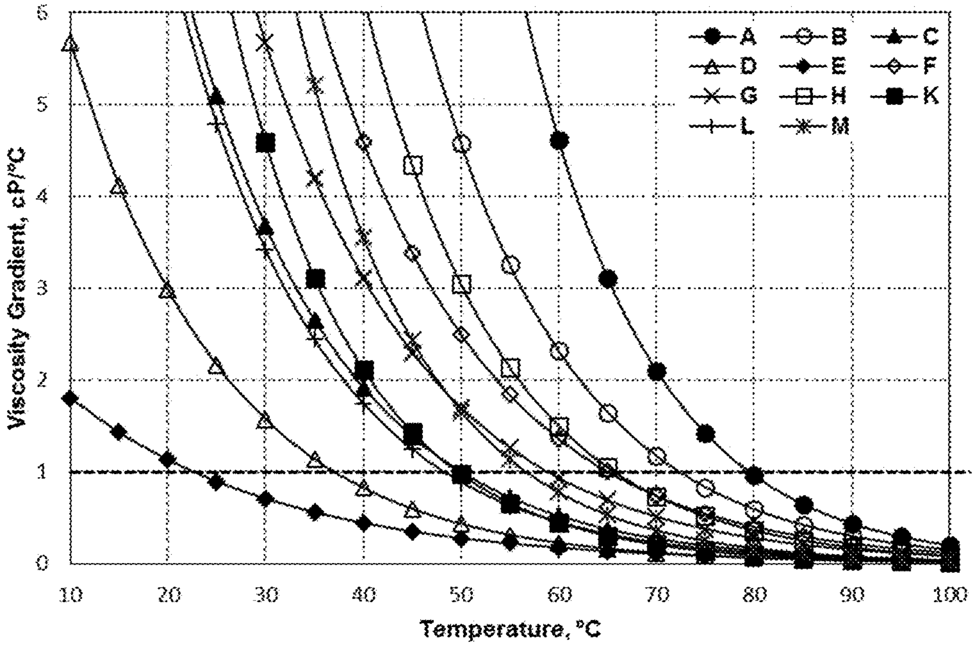
FIG. 2 is a plot of the rate of change of viscosity against temperature of the data of FIG. 1.

The fluids tested using the low fluid resistance inkjet printheads with open ended recirculation pressure chambers were analysed with respect to their properties against temperature (to assess properties at potential jetting temperature) and compared to standard inkjet fluids as follows. FIG. 1 shows a plot of viscosity versus temperature for five different fluids labelled A, B, C, D and E, and corresponding to fluids listed in Table 3. Fluids A and B are high viscosity development fluids made by BASF and for which, at 30° C., the viscosity is 293 mPa·s (Fluid B) and 656 mPa·s (Fluid A). Fluids C, F, G, L and M, also made by BASF, have intermediate viscosities of 74 mPa·s, 156 mPa·s, 108 mPa·s, 63 mPa·s and 119 mPa·s, respectively, at 30° C. Fluid H, made by Delo, has an intermediate viscosity of 182 mPa·s at 30° C., while Fluid K has intermediate viscosity of 72 mPa·s at 30° C. Fluids D and E are standard inkjet fluids having a viscosity of 32 mPa·s or lower at 30° C. Fluid D, Sunjet ULX5832 Cyan, is a standard UV ink; Fluid E, Itaca MA5115, is a standard ceramic ink. A key of fluids is provided in Table 3.

FIG. 1 further shows viscosity limits L1, L2 and L3. L1 indicates the 'traditional' limit of around 30 mPa·s above which conventional inkjet heads are believed to be unable to provide stable, good quality droplets. Above L1 the inventors have found, contrary to expectations, that fluids of much higher viscosities may be jetted: up to about L2 (65 mPa·s) with one drive mode, a 3-cycle mode, and up to around L3 (126 mPa·s) for another, single cycle, drive mode. In other examples L3 may be 130 mPa·s. The grey region above a fluid temperature of 90° C. in FIG. 1 indicates the maximum temperature beyond which the fluid may degrade and droplets fail to eject. This may for example be due to UV cured fluids curing thermally within the printhead. The values used to plot FIG. 1 are also listed, for convenient reference in the later description, in Table 2. The actual value of degradation depends on the specific fluid and the fluid temperature.

From FIG. 1 it can be seen that increasing the plateau of the fluid viscosity does not just shift the viscosity curve upwards in the plot of FIG. 1, it also shifts it to higher temperatures, meaning that while the viscosity at the plateau is overall increased, the onset of the plateau itself is shifted to a higher temperature.

Two types of fluid recirculating printheads of the Xaar 1003 family were used to test high viscosity fluids, differing only in nozzle volumes and ejecting 7.5 pl sub-droplets ("GS6") and 15 pl ("GS12") sub-droplets for a first mode of printing (HL mode), and in a second mode of printing ejecting 6 pl sub-droplets ("GS6") and 12 pl ("GS12") sub-droplets (3-cycle mode). The fluid flow path for the two printheads is otherwise identical. Each printhead has 1000 nozzles, one per pressure chamber, arranged in two parallel rows of 500 nozzles each. The pressure chambers are elongate and open to the fluid flow at opposite ends of the pressure chamber without a change in cross section from that of the pressure chamber. Each pressure chamber is bounded at opposing elongate sides by chamber walls comprising piezoelectric material. Upon actuation by a drive pulse of a drive signal, these walls deform to cause ejection of a droplet from the nozzle. This construction is also referred to as 'shared wall', referring to each piezoelectric wall being shared between two neighbouring chambers. The piezoelectric material is poled in a direction perpendicular to the direction of elongation of the chamber and perpendicular to the row direction of the nozzles, i.e. in the case of the Xaar 1003 head in the direction of the nozzle axis. This causes a shear mode deformation. This mode is made most efficient by constructing the piezoelectric walls such that they are formed of an upper portion poled in one direction, and a lower portion poled in the opposite direction, such that the deformation is 'chevron shaped' when viewed along the cross section of the chamber perpendicular to the direction of elongation. The Xaar 1003 printhead series is able to operate in an efficient shared-wall "chevron" shear mode. The flow path of the Xaar 1003 head will now be described in more detail with respect to FIGS. 5, 6 and 7.

Recirculation Flow Path

Regarding open ended pressure chamber recirculation, examples of such printheads were shown and described in WO 00/38928. WO 00/38928 teaches that fluid may be fed into an inlet manifold and returned via a return manifold, with the manifolds being common to and connected via each pressure chamber, so as to generate fluid flow through each chamber and thus past each nozzle during printhead operation.

Figure 5:
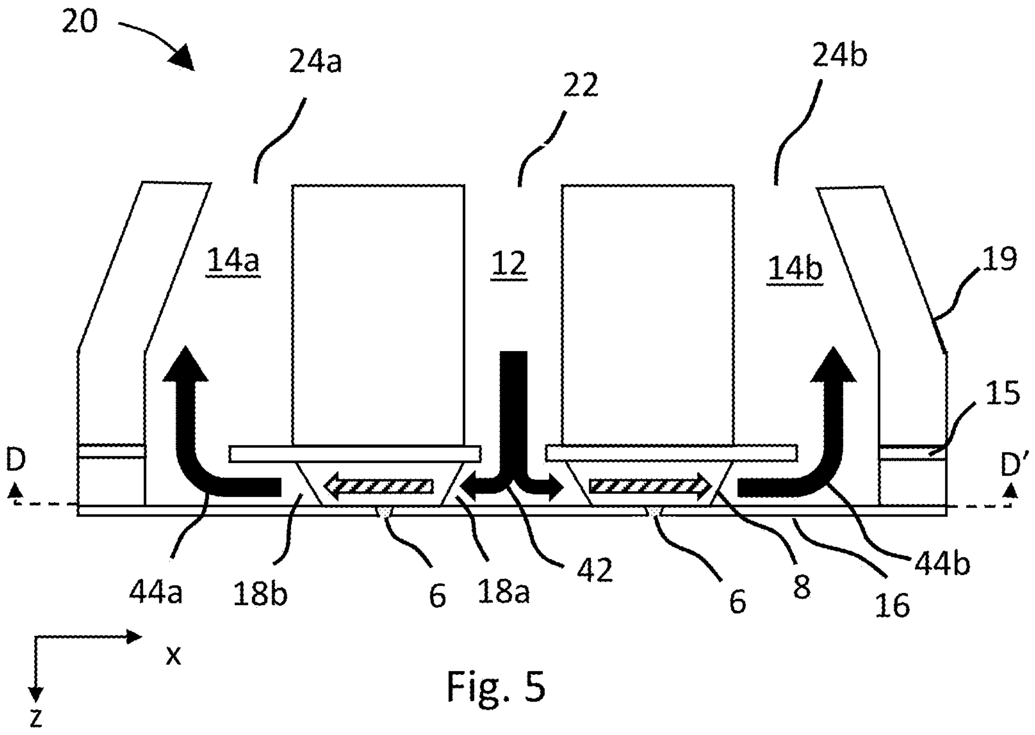
FIG. 5 is a schematic cross section of a low fluid resistance recirculation flow component of the printheads used to test the fluids.
Figure 6:
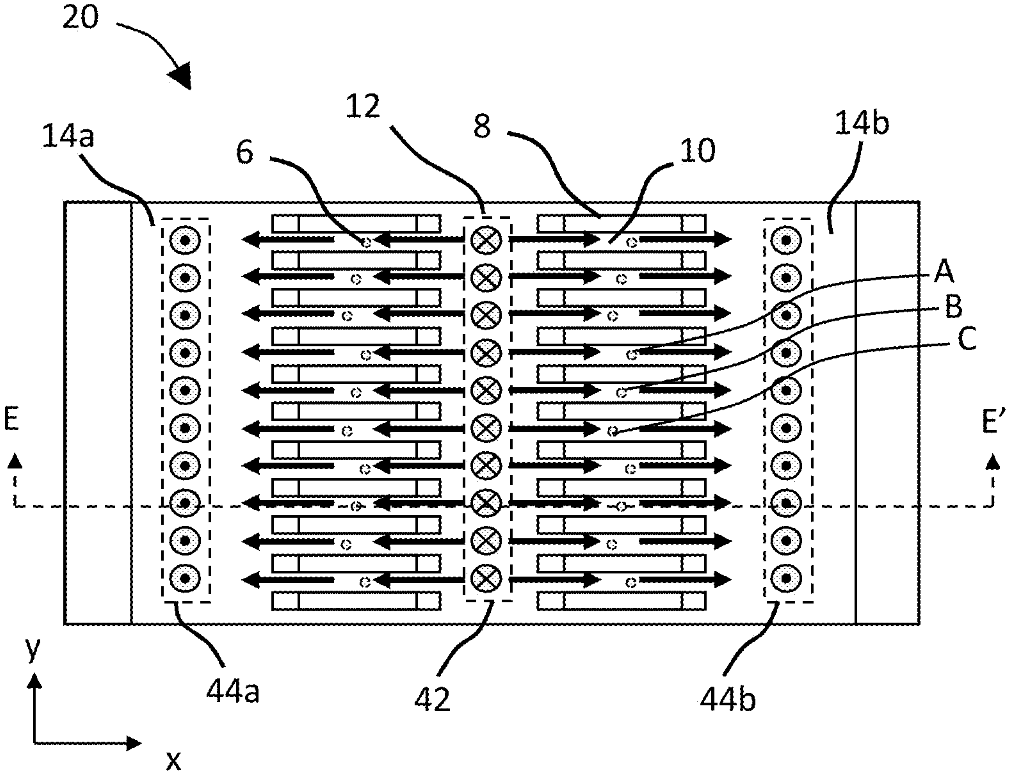
FIG. 6 is a schematic plan view taken along section D-D' of FIG. 5.

The fluid path of a printhead 30 such as the Xaar 1003 is schematically illustrated in FIGS. 5 and 6, where FIG. 5 is a cross section through the flow component 20 bisecting a pressure chamber 10 along the elongate direction of the chamber, and along the section E-E' indicated in FIG. 6. For this type of printhead as the Xaar 1003, this is the direction perpendicular to the row of nozzles 6. FIG. 6 meanwhile is a plan view of the flow component along section D-D' of FIG. 5, i.e. looking up into the flow component with the nozzle plate 16 removed.

Fluid enters the flow component 20 of the printhead via an inlet port 22 provided in a manifold portion 19 of the flow component 20. The inlet port 22 is common to the two rows of nozzles 6. In FIG. 5, the row of nozzles 6 extends into the page (here direction y). The fluid then travels as inlet flow 42 through common inlet 12 and divides into two flows flowing in opposite directions (here along x) through pressure chambers 10 (indicated in FIG. 6) of different rows. The pressure chambers are shown bounded by wall 8 on one side, and have an identical wall on the other side.

A manufacturing technique for forming pressure chambers 10 and electrodes and contacts to the electrodes is described in detail for example in WO 00/29217. Briefly, chambers 10 are machined in a base component of piezoelectric material so as to define piezoelectric channel walls 8. The two rows of chambers are formed in respective strips of piezoelectric material which are bonded to a planar surface of substrate 15. To address each chamber wall, electrodes are provided on the walls of the chambers, thereby to form actuators from chamber walls 8, as known e.g. from EP 0 277 703 A1, so that electrical signals may be selectively applied to the walls. A break in the electrodes allows the chamber walls of each row to be operated independently by means of electrical signals applied via electrical inputs (not shown). The chamber walls may thus act as actuator members that can cause droplet ejection. Substrate 15 is formed with conductive tracks (not shown), which are electrically connected to the respective chamber wall electrodes, and which extend to the edge of the substrate 15 where respective drive circuitry (integrated circuits) for each row of chambers is located.

The arrangement of the pressure chambers 10 is identical between the two rows of nozzles. The fluid travels through each pressure chamber, and exits the chambers to flow as return flow 44*a* into a common return 14*a* for one row and as return flow 44*b* into a common return 14*b* for the other row.

Each pressure chamber 10 has a nozzle 6 at or near its centre, provided in the nozzle plate 16 that bounds the chambers on one side. This is more easily seen in FIG. 6, which shows a portion of the two rows of nozzles, which in the Xaar 1003 extend to over 500 nozzles each. In addition, FIG. 6 shows the nozzles of each row in a 3-cycle mode pattern. Three neighbouring nozzles are successively offset along the elongate direction of the pressure chamber, in a repeating pattern for subsequent nozzle groups of three nozzles. The nozzles in each group of three may be referred to as the A, B and C group nozzles. This grouping will be further described below with respect to a second drive mode, the 3-cycle drive mode of a shared wall printhead.

FIG. 6 shows each chamber 10 bounded by chamber walls 8 on each side. The inlet 12 is shown with flow indicators of the common flow 42 in the droplet ejection direction (along z), which then splits to flow through each chamber 10. The return flow exits each chamber 10 and combines with the other return flows from the same row to form return flow 44. Return flow 44 passes through the common returns 14 and into the common return port 24.

When the chamber walls are provided with a drive signal, the walls 8 deform and a droplet is ejected from the nozzle 6. The flow past the nozzle contributing to return flow 44 is greater than the flow ejected from the nozzle 6 in the form of a droplet, allowing the printhead to operate in 'recirculation' mode. For this, a positive pressure is applied to the fluid entering the inlet port 22 via an inlet pipe 23 (shown in FIG. 7), and a negative pressure is applied to the fluid returning via return port 24 and return pipe(s) 25. In the case of the Xaar 1003, the two return ports 24*a*, 24*b* connect downstream to flow into one combined return pipe 25. The positive and negative pressure may, for example, be provided by an external fluid supply connected to the inlet and return pipes of the printhead 30. Fluid recirculation as referred to herein is provided when the fluid flow rate through a chamber 10 is higher than the rate of ink ejection from the chamber and may, in some cases, be five or ten times that rate.

It should be noted that the cross section of the (unactuated) pressure chamber remains constant and that each "open end" 18*a*, 18*b* of each pressure chamber 10 presents an opening into the pressure chamber 10 that has the same cross section as the pressure chamber itself. For the Xaar 1003 printhead family, this cross section is 0.0225 $mm^2$ for a chamber length of 1.8 mm. The resulting fluid resistance of the entire printhead with its two parallel row manifolds is around 0.8 mbar/(ml·min) for Xaar 1003 printheads GS6 and GS12. This means that each manifold row resistance is 1.6 mbar/(mlmin) and each chamber has a fluid resistance of 800 mbar/(mlmin).

Figure 7:
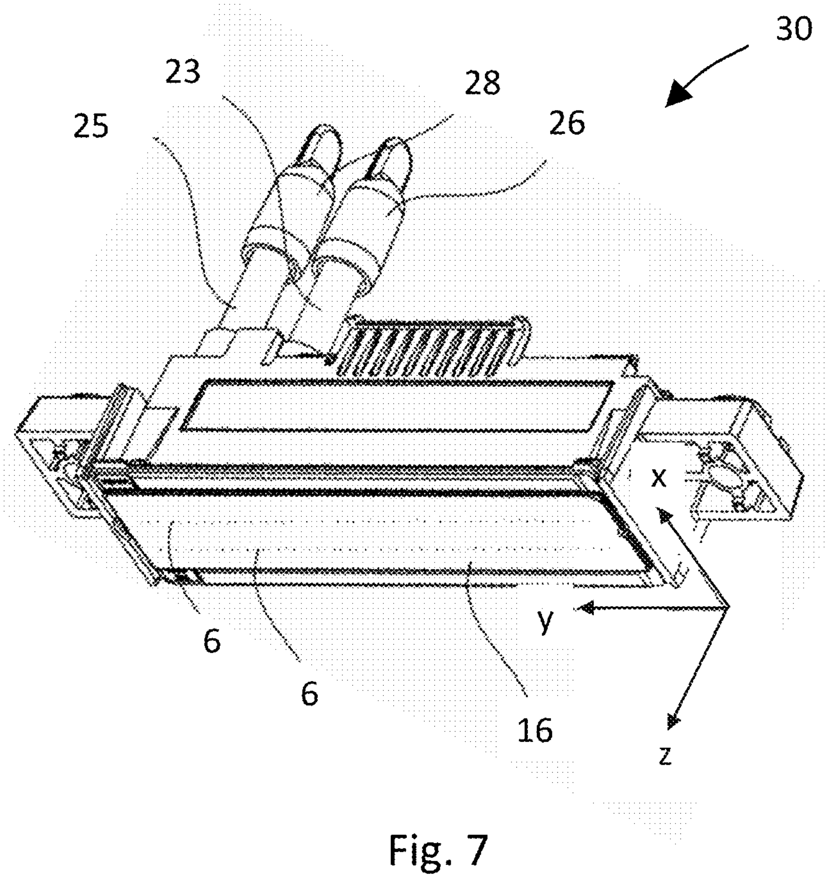
FIG. 7 is a three-dimensional view of the low fluid resistance piezoelectric printhead having a flow component according to the principles of FIGS. 5 and 6.

FIG. 7 shows the printhead 30 in a three-dimensional perspective from below, so that nozzle plate 16 with two rows of nozzles 6 can be seen, and the inlet pipe 23 and combined return pipe 25 of the flow component 20. The pipes are shown with covers 26, 28, for example used during shipping.

Next, a first and second drive mode will be described that were found to be suitable for jetting high viscosity fluids from a recirculation head such as the Xaar 1003.

High Laydown/First Mode

Figure 8A:
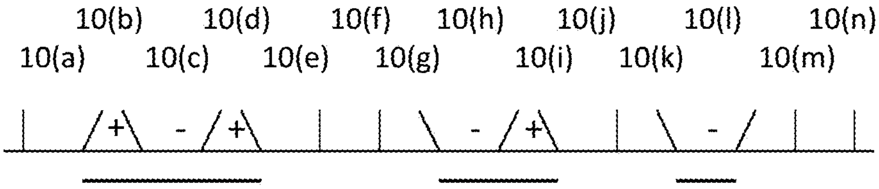
FIG. 8 is a representation of a first mode of operating a droplet deposition apparatus illustrating chamber wall movement to produce a first pattern.
Figure 8B:
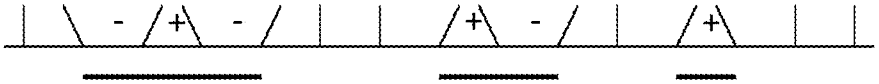

FIGS. 8(*a*) and 8(*b*) show a method according to a first drive mode, previously described in detail in WO 2018/224821 and WO 2019/058143. In this mode, a sub-droplet is ejected from each pressure chamber 10 for which both walls move in opposing senses inwards within the same drive signal. As a result, the droplets ejected within the drive signal duration all land along the same pixel line on the media. As indicated by emboldened horizontal lines in FIGS. 8(*a*) and 8(*b*), based on input data, certain of the chambers within the nozzle row are assigned as firing chambers during application of a drive signal (in the example shown, chambers 10(*b*), 10(*c*), 10(*d*), 10(*h*), 10(*i*), 10(1)) and will deposit droplets during application of the drive signal, while the remaining chambers (in the example shown, chambers 10(*a*), 10(*e*), 10(*f*), 10(*g*), 10(*j*), 10(*k*), 10(*m*), 10(*n*)) are assigned as non-firing chambers. As is apparent from the drawing, this assignment results in bands of one or more contiguous firing chambers, indicated by the emboldened horizontal lines, separated by bands of one or more contiguous non-firing chambers for one cycle of the drive signal.

With this assignment having been carried out, the walls of certain of the chambers are then actuated by the drive signal. FIGS. 8(*a*) and 8(*b*) show the head at respective points in the actuation cycle of the drive signal. More particularly, FIG. 8(*a*) shows a point in the actuation cycle where the walls are at one extreme of their motion, whereas FIG. 8(*b*) shows the point a fraction of a cycle later, when the walls are at the opposite extremes. The drive signal respective FIGS. 8(*a*) and 8(*b*) are illustrated in FIG. 9.

Figure 9A:
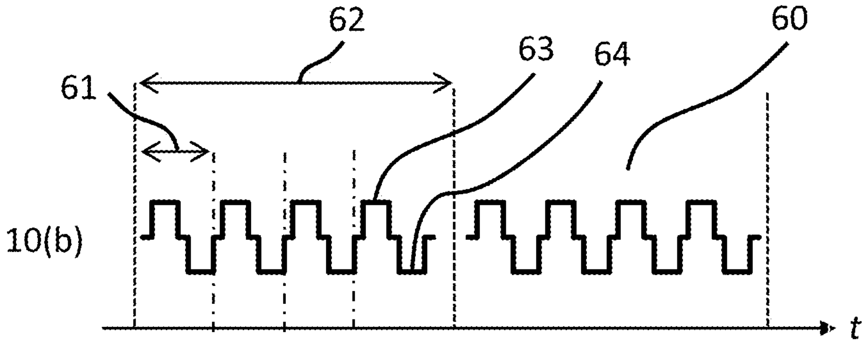
FIG. 9*a* is an illustration of a drive pulse comprising sub droplet pulses suitable for the first drive mode illustrated in FIG. 8.
Figure 9B:
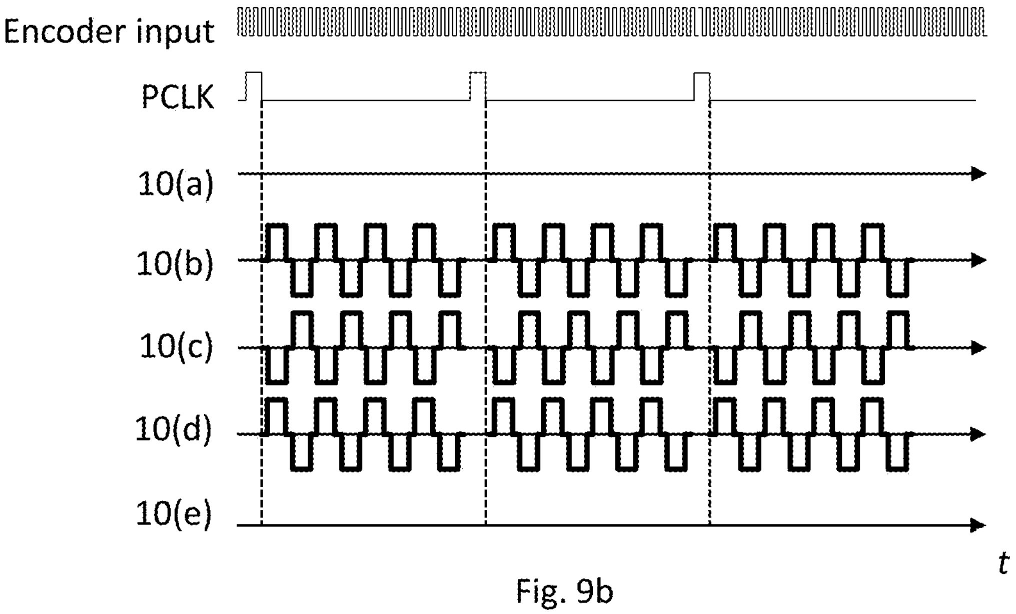
FIG. 9*b* is an illustration of drive pulses applied to the first five chamber walls of FIG. 8.

FIG. 9(*a*) shows a close up of a drive signal 60 made up of sub droplet pulses 61. Four sub droplet pulses are shown for one pixel period 62, over which the four sub droplets form a drop to land in a pixel along the pixel line. For the first mode or high laydown mode, each sub droplet pulse may cause ejection from neighbouring chambers. For example for chamber 10(*b*), the first part of a sub droplet pulse 63 to one wall of chamber 10(*b*), for example the shared wall between 10(*b*) and 10(*c*), and to the other wall, i.e. the shared wall of chambers 10(*b*) and 10(*a*), causes the walls of chamber 10(*b*) to move inward, as shown in FIG. 8(*a*), and chamber 10(*b*) ejects a sub droplet. The second part of the sub droplet pulse 64 to one wall of chamber 10(*b*), for example the shared wall between 10(*b*) and 10(*c*), and a similar pulse applied to the shared wall between chamber 10(*c*) and 10(*d*), causes the shared wall between 10(*b*) and 10(*c*) to move outwards of chamber 10(*b*), so that both walls of chamber 10(*c*) move inward, as shown in FIG. 8(*b*), and chamber 10(*c*) ejects a sub droplet, while chamber 10(*b*) does not eject a sub droplet. The next sub droplet pulse repeats the wall motion until four sub droplets in total are ejected to form the drop that is deposited into the pixel on the medium. FIG. 9(*b*) shows example drive pulses to chambers 10(*a*) to 10(*e*) of FIG. 8, where firing chambers 10(*b*) to 10(*d*) receive drive signals, while non-firing chambers 10(*a*) and 10(*e*) do not. It can be seen that the drive signal for chamber 10(*c*) is opposite to the drive signal for chambers 10(*b*) and 10(*d*) as shown in FIGS. 8(*a*) and 8(*b*). It also illustrates the timing of drive signals sent to each of the chambers. The drive signal is initiated by a pixel clock trigger PCLK. The pixel clock is related to the encoder of the moving mechanism of the printing medium, and allows the controller of the droplet deposition apparatus to determine the position of the pixel line on the medium and to coordinate the droplet ejection from the nozzle of the pressure chambers as a result of application of the drive signal. Upon receiving the pixel clock trigger, the controller that sends the drive signal to the chambers causes the chambers to receive the drive signal. After a predetermined time from initiating the drive signal for a first pixel line, where the predetermined time is related to the medium speed and the chamber acoustics, the drive signal is sent again to cause the nozzles to eject droplets into the second pixel line.

As is apparent from comparing the two drawings in FIG. 8, for each one of the firing chambers 10(*b*), 10(*c*), 10(*d*), 10(*h*), 10(*i*), 10(1), the walls move with opposing senses.

As to the non-firing chambers, two different types of behaviour for their walls may be observed: for some of the non-firing chambers, specifically, those adjacent a band of firing chambers (in the example shown, chambers 10(*a*), 10(*e*), 10(*g*), 10(*j*), 10(*k*), 10(*m*)), one wall is moved, while the other remains stationary; for other non-firing chambers, specifically those not adjacent a band of firing chambers (in the example shown, chambers 10(*f*), 10(*n*)), both walls remain stationary.

Figure 10A:
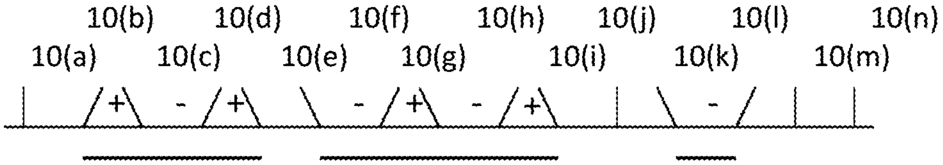
FIG. 10 is a representation of a first mode of operating a droplet deposition apparatus according to the same example as illustrated in FIG. 8, but with different input data being used.
Figure 10B:
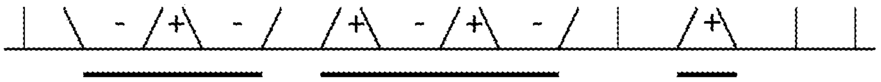

Attention is next directed to FIGS. 10(*a*) and 10(*b*), which show a first mode according to the same example as FIGS. 8(*a*) and (*b*), when utilised to deposit droplets in accordance with different input data. As with FIGS. 8(*a*) and 8(*b*), FIGS. 10(*a*) and 10(*b*) show the head at respective points in the actuation cycle. As may be seen from FIGS. 10(*a*) and 10(*b*), based on the new input data, different chambers 10 have been assigned as firing chambers and non-firing chambers. More particularly, it may be noted that the assignment has resulted in a band of non-firing chambers that consists of only a single non-firing chamber, specifically chamber 10(*e*).

As is apparent from comparing the two drawings, for each one of the firing chambers 10(*b*), 10(*c*), 10(*d*), 10(*f*), 10(*g*), 10(*h*), 10(*i*), 10(1), the walls move with opposing senses, as in FIGS. 8(*a*) and 8(*b*).

However, with the non-firing chambers, three (as opposed to two) different types of behaviour for their walls may be identified: for some of the non-firing chambers, specifically, those adjacent a band of firing chambers (in the example shown, chambers 10(*a*), 10(*j*), 10(*k*), 10(*m*)), one wall is moved, while the other remains stationary; for other non-firing chambers, specifically those not adjacent a band of firing chambers (in the example shown, chamber 10(*n*)), both walls remain stationary; for still others, specifically, the chamber 10(*e*) in the single chamber wide band of non-firing chambers, the walls move with the same sense.

It may be understood that moving the walls for each firing chamber as shown in FIGS. 8 and 10 causes the release of one or more droplets from the chamber in question upon application of one or more actuation pulses. The resulting droplets form bodies of fluid disposed on a line on the medium, with the bodies of fluid being separated (at least instantaneously upon landing—the fluid bodies may merge on the medium) on this line by respective gaps for each of the bands of non-firing chambers. It should be understood that the size of each such gap will thus generally correspond in size to the width of the respective band of non-firing chambers.

As can be seen from the actuation sequences in FIGS. 8 and 10, for example, if the drive signal applied in FIG. 10 were to directly follow the drive signal in FIG. 8, some non-firing chambers may only require a small wall movement to provide a transition from a non-firing chamber to a firing chamber. In addition, it is possible for a large number of the walls of the non-firing chambers to remain stationary. This may improve the lifetime of the head, by reducing the number of wall movements carried out by the walls in order to achieve a certain laydown density of droplet fluid on the substrate.

The methods illustrated in FIGS. 8, 9 and 10 represent a high laydown drive mode, providing a high rate of throughput. The firing chambers may be actuating at or close to the resonant frequency and thus achieve a "pumping power" (the amount of droplet fluid deposited per second for each inch of the width of the head) significantly higher than 500 μl/(s·inch), in several cases higher than 750 μl/(s·inch), and potentially as high as 1000 μl/(s·inch). Both the reduced drive voltage and the more efficient use of the actuating walls improves the life of the head.

Printheads have a maximum acceptable drive voltage, thus limiting the maximum impulse able to be imparted on the fluid and therefore limiting a maximum viscosity that is possible to eject from the nozzles. The lower drive voltage resulting from the near-resonant single-cycle High Laydown drive mode (the first mode) means that the viscosity can be increased further before reaching the voltage limit of the printhead.

Applying drive signals that move opposing walls inwards for each firing chamber as shown in FIGS. 8 and 10 causes the release of one or more sub droplets from the firing chamber. The resulting sub droplets form bodies of fluid disposed on a pixel line on the medium, with the bodies of fluid each landing in their respective pixels of the pixel line and being separated (at least instantaneously upon landing—the fluid bodies may merge on the medium) on this line by respective gaps between each firing band of the bands of non-firing chambers. It should be understood that the size of each such gap will thus generally correspond in size to the width of the respective band of non-firing chambers.

In order that the thus-deposited bodies of fluid lie on a line on the medium, it will often be convenient for the actuations of the firing and non-firing chambers to overlap in time. This is, though, not essential, for example in cases where the nozzles of the head are offset in some manner such as in ejection groups A, B, C indicated in FIG. 6. Further, in some cases, they may be synchronised such that the actuations for all chambers begin at the same time (though it would of course also be possible for them to be synchronised to end at the same time).

3-Cycle Mode/Second Mode

In a second drive mode, the printhead is driven in a 3-cycle mode. The nozzles of each row are arranged in groups of three. The nozzles in each group are offset in a direction perpendicular to the row direction. Nozzles in different groups having the same offset distance with respect to the row direction are in the same ejection group (cycle group), this providing three ejection groups A, B and C, as indicated in FIG. 6 by nozzles of group A, B and C. In FIG. 6 the offset is along x. During printing, the nozzles eject droplets into a pixel line as the printhead moves relative to the media in a printing direction (in FIG. 6 this might be along the x-direction) such that the group located furthest downstream with respect to the printing direction is actuated first, the interim group is actuated second, and the group located furthest upstream of the printing direction is actuated last. The timing between actuations for each group relates to the media speed and the acoustic properties of the pressure chamber.

Figure 11:
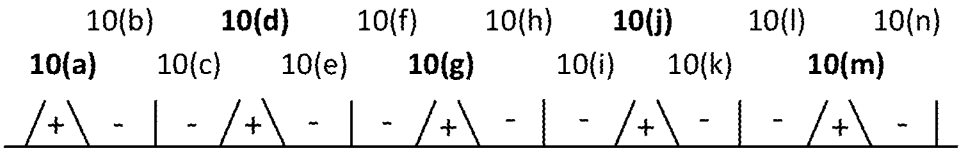
FIG. 11 is a representation of a second mode of operating a droplet deposition apparatus illustrating chamber wall movement for 3-cycle printing.
Figure 11:
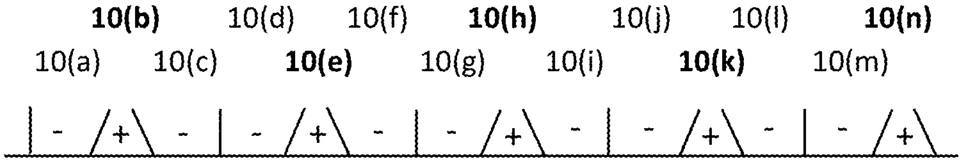
Figure 11:
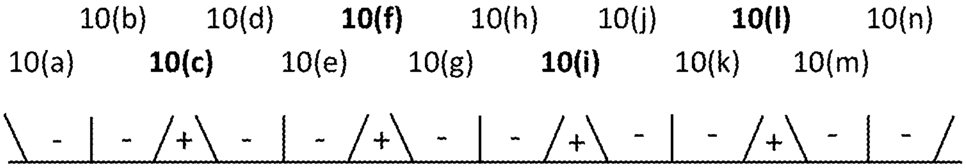

In 3-cycle printing of the second drive mode, a droplet is ejected when both walls of a pressure chamber move inwards to create a pressure pulse along the chamber. The neighbouring chambers experience a low pressure since their opposite chamber wall remains stationary. In FIG. 11(*a*), the chamber wall movement for "Group A" of the first cycle is shown. For chambers 10(*a*) to 10 (*n*), every third chamber is actuated and its walls move inwards. These are chambers 10(*a*), 10(*d*), 10(*g*), 10(*j*) and 10(*m*) shown in bold numerals. These chambers deposit droplets into respective pixels of the pixel line. The second cycle, group B, is actuated next, as shown in FIG. 11(*b*) by chambers 10(*b*), 10(*e*), 10(*h*), 10(*k*) and 10(*n*). These B-group chambers now deposit droplets into respective pixels of the same pixel line. Meanwhile the remaining chambers experience low pressure (causing intake of fluid). The final cycle, the C-cycle, is shown in FIG. 11(*c*) for actuated chambers 10(*c*), 10(*f*), 10(*i*), and 10(1) shown in bold numerals, during which these chambers are actuated to deposit droplets into respective pixels of the same pixel line. The pixel line is now fully printed.

Figure 12:
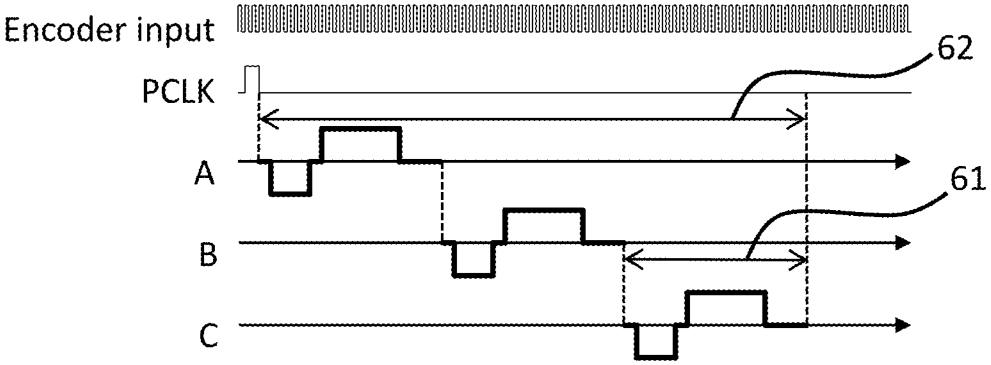
FIG. 12 is an illustration of drive pulses applied to each cycle of FIG. 11.

FIG. 12 illustrates the timing of drive pulses sent to each of the chambers of group A, B and C. As before, the drive signal applied over the pixel period 62 is initiated by a pixel clock trigger PCLK. Upon receiving the pixel clock trigger, the controller causes the chambers of Group A to receive a sub droplet pulse 61 (shown for Group C but identical in shape for all other groups). After a predetermined time from initiating the Group A sub droplet pulse, where the predetermined time is related to the medium speed and the chamber acoustics, the sub droplet pulse is sent to group B. After a further lapse of the predetermined time from initiation of the sub droplet pulse for Group B, the sub droplet pulse is sent to group C. If the medium speed is unchanged, the predetermined time remains constant. Each of the three cycles causes the ejection of one sub droplet per chamber. To complete printing into the pixel line, the cycle is repeated for the required number of sub droplets for that pixel.

Jetting Tests

Xaar 1003 GS6 and GS12 printheads were used in the first and second mode to test various standard fluids against development inks of high to very high jetting viscosity. The ejection flow rate through the nozzles is determined by the number of sub-droplets ejected.

With the GS12 head, which can eject sub droplets of volume of 15 pl each in High Laydown (HL), or first, mode, printing full duty with 4 sub droplets per pixel (i.e. a total drop volume of 60 pl) provides an ejection rate of about 100 ml/min for a fluid of viscosity of 65 mPa·s at a pixel clock frequency of 28 kHz when all nozzles are firing (or 100% duty).

Reliable printing conditions were found at a low flow ratio of 1.5:1 of the recirculation volume flow rate (recirculation rate) to drop ejection volume flow rate (ejection rate). This corresponds to a recirculation rate of 150 ml/min. The low fluid resistance path of the Xaar 1003 printhead requires a relatively low differential pressure DP (DP being the difference in pressure between inlet and return pipes 23, 25 to the printhead) of about 529 mbar to achieve the recirculation flow rate of 150 ml/min for this 65 mPa·s fluid. For a viscosity of 97 mPa·s and the same recirculation flow rate of 150 ml/min, the DP needs to be 790 mbar. A higher end of differential pressure to be applied, such as including 790 mbar, may necessitate a higher specification of fluid supply components to reduce the variability in the pressure applied, the design of such a fluid supply being within standard engineering capability. The values are summarised in Table 1A for fluid A, which allow one to compare standard inkjet fluid such as fluid D (Sunjet ULX5832), with a viscosity of 32 mPa·s at 30° C., with non-traditional inkjet fluids such as fluids A (BASF high viscosity development fluid), C (PEG 400), K (high viscosity development fluid), H (Delo Katiobond OM6600), L (BASF Ultracur3D WS07) and M (BASF Ultracur3D ST30 LV).

As can be observed in Table 1A, fluids A, C, K, H, L and M have viscosities higher than traditional inkjet fluids. Fluid A has the highest viscosity of 656 mPa·s at 30° C., followed by fluid H with 182 mPa·s at 30° C. Fluids C, K, L and M have, at 30° C., viscosities within the range of 63 to 87 mPa·s. Fluid A was heated to different jetting temperatures of 60° C. and 70° C. to achieve viscosities of 97 mPa·s and 65 mPa·s respectively.

Turning to the GS6, when driven in the first mode this head deposits a lower total drop volume per pixel per nozzle of 30 pl, resulting from 4 sub-drops at 7.5 pl, i.e. half the total drop volume of the GS12 using the first drive mode. At the same print frequency of 28 kHz, the ejection flow rate is therefore halved to about 50 ml/min at 100% duty (when all nozzles are firing) for the GS6 in comparison to the GS12, and similarly a flow ratio of 1.5:1 corresponds to a recirculation flow rate of about 75 ml/min. For a fluid of viscosity of 65 mPa·s, the differential pressure required to achieve this flow rate is about 250 mbar. For a fluid of viscosity of 97 mPa·s the DP required is 370 mbar, and for a viscosity of 126 mPa·s the DP required is 475 mbar. These values are summarised in Table 1B, for fluids A and B. Fluid A as before provides viscosities of 65 mPa·s and 97 mPa·s at jetting temperatures of 70° C. and 60° C. respectively, and fluid B was used to provide a viscosity of 126 mPa·s at jetting temperature of 45° C. (lowered from a viscosity of 293 mPa·s at 30° C.). Fluid B is also a high viscosity development fluid.

Turning to results from using the 3-cycle mode, or second mode, the sub droplet volumes for the GS6 and GS12 heads are slightly lower compared to the first mode and the print frequency is only 6 kHz due to 3-cycle driving compared to the first mode at 28 kHz. In 3-cycle mode, seven sub droplets (more than with the first, HL, mode) were jetted to form a total drop volume deposited into a pixel.

For the GS12, the sub droplets have a volume of 12 pl each, or a total drop volume of 84 pl; for the GS6, the sub droplets have volumes of 6 pl and the total drop volume per pixel is 42 pl. For a 5:1 recirculation ratio for the GS12 and a 10:1 recirculation ratio for the GS6, this again equates to a recirculation rate of 150 ml/min and an ejection rate of about 30 ml/min.

Fluids A, C, D, H, K, L and M were tested with the GS12. Fluids A and K are development fluids of viscosity much higher than traditional inkjet fluids like Fluid D: Fluid A provides a viscosity of 656 mPa·s while fluid K provides a viscosity of 72 mPa·s at 30° C., compared to 32 mPa·s at 30° C. for fluid D (Sunjet ULX5832 Cyan). Different fluids require different differential pressures DP to keep the recirculation rate at 150 ml/min. For example, fluid A requires a differential pressure DP of about 494 mbar to supply a recirculation rate of 150 ml/min at a fluid viscosity of 65 mPa·s for a temperature of 70° C. On the other hand, fluid K has a difference pressure of about 403 mbar at a fluid viscosity of 53 mPa·s for a temperature of 35° C.

Further examples are: fluid C (PEG400) which has a differential pressure of 774 mbar at a fluid viscosity of 95 mPa·s for a temperature of 25° C.; fluid H (Delo Katiobond OM6600) which has a differential pressure of 502 mbar at a fluid viscosity of 66 mPa·s for a temperature of 45° C.; fluid L (BASF Ultracur3D WS07) which has a differential pressure of 479 mbar at a fluid viscosity of 63 mPa·s for a temperature of 30° C.; and fluid M (BASF Ultracur3D ST30 LV) which has a differential pressure of 742 mbar at a fluid viscosity of 91 mPa·s for a temperature of 27° C.

In contrast, fluid D was jetted at 45° C. and viscosity of 17 mPa·s. With the same settings of frequency and number of sub droplets per pixel, a differential pressure DP of just 129 mbar is required to supply 150 ml/min recirculation rate.

A summary of jettable fluids and their properties for the second mode is provided in Table 1A for the GS12 printhead and in Table 1B for the GS6 printhead.

TABLE 1A

| GS12 | | | | | | | | | | |
|---|---|---|---|---|---|---|---|---|---|---|
| mode | Fluid | $\eta_{jetting}$, mPa·s | DP, mbar | Flow ratio | Flow rate, ml/min | $T_{jetting}$, ° C. | $\eta_{30° C.}$, mPa·s | Ejection rate, ml/min | Sub-droplet volume, pl | Total Drop volume, pl |
| 2 | D | 17 | 129 | 5:1 | 150 | 45 | 32 | 30 | 12 | 84 |
| 2 | A | 65 | 494 | 5:1 | 150 | 70 | 656 | 30 | 12 | 84 |
| 2 | H | 66 | 502 | 5:1 | 150 | 45 | 182 | 30 | 12 | 84 |
| 2 | K | 53 | 403 | 5:1 | 150 | 35 | 72 | 30 | 12 | 84 |
| 2 | L | 63 | 479 | 5:1 | 150 | 30 | 63 | 30 | 12 | 84 |
| 1 | A | 65 | 529 | 1.5:1 | 150 | 70 | 656 | 100 | 15 | 60 |
| 1 | A | 97 | 790 | 1.5:1 | 150 | 60 | 656 | 100 | 15 | 60 |
| 1 | C | 95 | 774 | 1.5:1 | 150 | 25 | 74 | 100 | 15 | 60 |
| 1 | K | 88 | 717 | 1.5:1 | 150 | 27 | 72 | 100 | 15 | 60 |
| 1 | L | 63 | 513 | 1.5:1 | 150 | 30 | 63 | 100 | 15 | 60 |
| 1 | M | 91 | 742 | 1.5:1 | 150 | 27 | 87 | 100 | 15 | 60 |

TABLE 1B

| GS6 | | | | | | | | | | |
|---|---|---|---|---|---|---|---|---|---|---|
| mode | Fluid | $\eta_{jetting}$, mPa·s | DP, mbar | Flow ratio | Flow rate, ml/min | $T_{jetting}$, ° C. | $\eta_{30° C.}$, mPa·s | Ejection rate, ml/min | Sub-droplet volume, pl | Total Drop volume, pl |
| 2 | D | 17 | 130 | 10:1 | 150 | 45 | 32 | 15 | 6 | 42 |
| 1 | A | 65 | 250 | 1.5:1 | 75 | 70 | 656 | 50 | 7.5 | 30 |
| 1 | A | 97 | 370 | 1.5:1 | 75 | 60 | 656 | 50 | 7.5 | 30 |
| 1 | B | 126 | 475 | 1.5:1 | 75 | 45 | 293 | 50 | 7.5 | 30 |

TABLE 2

| FIG. 1 data | | | | | | | | | | |
|---|---|---|---|---|---|---|---|---|---|---|
| T, ° C. | η at 0.6 Pa, mPa·s | | | | | | | | | |
| Fluid | A | B | C | D | E | F | G | H | K | L | M |
| 10 | 3004 | 1052 | 225 | **96** | **45** | 485 | 327 | 738 | 292 | 207 | 477 |
| 15 | 2042 | 757 | 167 | **72** | 37 | 362 | 246 | 519 | 202 | 151 | 332 |

TABLE 2-continued

| FIG. 1 data | | | | | | | | | | | |
|---|---|---|---|---|---|---|---|---|---|---|---|
| T, ° C. | η at 0.6 Pa, mPa·s | | | | | | | | | | |
| Fluid | A | B | C | D | E | F | G | H | K | L | M |
| 20 | 1392 | 548 | **126** | **55** | 30 | 272 | 185 | 365 | 142 | **111** | 234 |
| 25 | 952 | 399 | **95** | 42 | 25 | 205 | 141 | 258 | **100** | **83** | 165 |
| 30 | 656 | 293 | **74** | 32 | 21 | 156 | **108** | 182 | **72** | **63** | **119** |
| 35 | 455 | 217 | **58** | 26 | 18 | **119** | **83** | **129** | **53** | **48** | **87** |
| 40 | 320 | 164 | **47** | 21 | 16 | **93** | **65** | **92** | **45** | 38 | **65** |
| 45 | 229 | **126** | 39 | 17 | 14 | **73** | **52** | **66** | 32 | 30 | **51** |
| 50 | 167 | **98** | 33 | 15 | 12 | **58** | 42 | **48** | 26 | 25 | 40 |
| 55 | **125** | **79** | 28 | 13 | 11 | **48** | 34 | 35 | 22 | 21 | 34 |
| 60 | **97** | **65** | 25 | 12 | 10 | 40 | 29 | 26 | 19 | 18 | 29 |
| 65 | **78** | **55** | 23 | 11 | 9 | 34 | 25 | 20 | 17 | 17 | 26 |
| 70 | **65** | **48** | 21 | 10 | 9 | 29 | 22 | 15 | 16 | 15 | 23 |
| 75 | **56** | 43 | 20 | 9 | 8 | 26 | 20 | 12 | 15 | 14 | 22 |

TABLE 3

| Fluid key | | |
|---|---|---|
| Fluid | Fluid | η at 30° C.; mPa · s |
| A | BASF High Viscosity Development Fluid | 656 |
| B | BASF High Viscosity Development Fluid | 293 |
| C | PEG400 | 74 |
| D | Sunjet ULX5832 Cyan | 32 |
| E | Itaca MA5115 Brown | 21 |
| F | BASF High Viscosity Development Fluid | 156 |
| G | BASF High Viscosity Development Fluid | 108 |
| H | Delo Katiobond OM6600 | 182 |
| K | High Viscosity Development Fluid | 72 |
| L | BASF Ultracur3D WS07 | 63 |
| M | BASF Ultracur3D ST30 LV | 119 |

Accordingly, a droplet deposition apparatus 1 is provided comprising a droplet deposition head 30, a fluid supply 40 and a controller; wherein the droplet deposition head comprises one or more fluid chambers 10 each having a nozzle 6, a fluid inlet path having a fluid inlet 23 into the head, and ending in the one or more nozzles, and a fluid return path starting at the one or more nozzles and ending in a fluid return 25 of the head. Each fluid chamber 10 comprises two opposing chamber walls 8 comprising piezoelectric material and deformable upon application of an electric drive signal 60 so as to eject a fluid droplet from the nozzle 6. The fluid supply 40 is configured to supply a fluid to the fluid inlet 23 at a differential pressure as measured between the fluid inlet 23 and the fluid return 25. The controller is configured to apply a drive signal to the piezoelectric chamber walls such that the nozzle or nozzles deposit droplets of a fluid having a viscosity in the range from 45 mPa·s to 130 mPa·s at a jetting temperature between 20° C. and 90° C., and wherein the differential pressure applied by the fluid supply 40 causes a fluid return flow into the fluid return at a rate of between 50 ml/min and 200 ml/min.

The Xaar 1003 printhead has been operated with fluid at a jetting temperature of 90° C., such as a hot melt wax. As stated before, the upper limit of the jetting temperature and beyond which a fluid degrades and becomes unjettable or unreliable depends on the specific fluid properties.

In some implementations of the droplet deposition apparatus, the ratio of the recirculation volume flow rate (recirculation rate) to drop ejection volume flow rate (ejection rate) may be 1.5:1 to ensure reliable printing conditions. In addition, this ratio of 1.5:1 may correspond to a recirculation rate of 150 ml/min.

In some implementations, the viscosity of the fluid may be 65 mPa·s, requiring a differential pressure DP (DP being the difference in pressure between inlet and return pipes 23, 25 to the printhead) of about 529 mbar to achieve the recirculation flow rate of 150 ml/min for this 65 mPa·s fluid. In alternative implementations, the viscosity of the fluid may be 97 mPa·s, requiring a differential pressure DP of 790 mbar.

The differential pressure may be applied by applying a positive pressure to the fluid inlet 23 and a negative to the return 25. For a two nozzle row printhead, the two return ports 24*a*, 24*b* may be combined downstream to flow into one combined return 25.

In some arrangements, the fluid supply 40 may be configured to heat the fluid to a temperature in the range of 20° C. to 90° C. and to provide the heated fluid to the fluid inlet at the corresponding viscosity of 45 mPa·s to 130 mPa·s. The corresponding viscosity provided to the fluid inlet may in turn provide the predefined jetting viscosity of the fluid when it enters the pressure chambers 10. The predefined jetting viscosity is the viscosity that is previously determined to be suitable for jetting. The predefined jetting viscosity may correspond to a predefined jetting temperature, for example as determined from measurements such as those provided in Table 2. The bold values of Table 2 show the temperatures and corresponding viscosities at which the fluids were jetted.

The droplet deposition head may further comprise a heater 58, 59 configured to heat the fluid to jetting temperature. Such a heater, heater 58, may be comprised within the fluid supply 40. Additionally, or instead, an onboard heater 59 may be provided within the printhead 30, the heater 59 being preferably located in close proximity and thermal contact to the pressure chambers 10.

From FIG. 1 (and Table 1) it can be seen that the viscosity at jetting temperature for the high viscosity fluids may be much higher than the conventional viscosity range of up to and around 30 mPa·s. For these fluids, the viscosity at 30° C. may be extremely high. In some cases therefore, the viscosity of the fluid at 30° C. may lie in a range of 60 mPa·s to 660 mPa·s. A suitable jetting viscosity may be obtained by heating the fluid. Fluids A, B, F and G are High Viscosity Development Fluids formulated by BASF and it is expected that routine experimentation may identify suitable high viscosity fluids capable of being jetted at a suitable jetting viscosity, such as for Fluid A the viscosity of 656 mPa·s at 30° C. drops to 65 mPa·s at 70° C. and becomes jettable. Such fluids may for example be high molecular weight and/or particle loading variants of standard fluids and using standard solvents. Another example is shown by Fluid H, which has a relatively high viscosity of 182 mPa·s 30° C. that drops to 48 mPa·s at 50° C. From the experiments therefore it was found that for fluids having a viscosity at 30° C. that ranges from 60 to 660 mPa·s (or a viscosity at 20° C. ranging from 30 mPa·s to 1392 mPa·s), each fluid has a corresponding viscosity at a temperature ranging from 20° C. to 90° C. in the range of 45 mPa·s (Fluid A at 90° C., FIG. 1) to 120 mPa·s (Fluid C at 20° C., FIG. 1). Similarly, from the experiments in Table 1, for fluids having a viscosity at 20° C. ranging from 30 mPa·s to 1392 mPa·s, a temperature with a corresponding viscosity could be identified that allowed the fluid to be jetted; in this case a jetting temperature from 20° C. to 90° C. provided a selection of jettable viscosities in the range of 45 mPa·s (Fluid D, 42 mPa·s at 25° C., and which is also jettable at 20° C. at a viscosity of 55 mPa·s) to 120 mPa·s (Fluid G, 108 mPa·s at 30° C., or Fluid F, 119 mPa·s at 35° C.), or up to 130 mPa·s for Fluids A (125 mPa·s at 55° C.), B (126 mPa·s at 45° C.), C (126 mPa·s at 20° C.) and H (129 mPa·s at 35° C.).

Regarding the fluid path of the head, the fluid resistance as measured between the fluid inlet and the fluid return may be equal to or lower than 800 mbar/(m1 min) per fluid chamber. The pressure chambers for open ended designs pose the highest fluid resistance within the printhead. Such fluid resistances may be equal to or lower than those posed by a pressure chamber of constant cross sectional area of 0.0225 $mm^2$ (in the unactuated state) and having a chamber length of 1.8 mm, where the chamber length is along a direction perpendicular to the cross sectional area.

Furthermore, in some implementations of the head 30, the operation of the head may represent an efficient mode of operation, wherein the maximum peak to peak voltage of the drive signal is less than or equal to 35 V to eject a droplet of a volume between 7 to 120 pl at a droplet ejection velocity of 11 m/s. In some implementations, the peak to peak voltage may be less than 30 V to eject a droplet of a volume between 7 to 120 pl at a droplet ejection velocity of 11 m/s. Furthermore, in some implementations, the peak to peak voltage may be less than 20 V to eject a droplet of a volume between 7 to 120 pl at a droplet ejection velocity of 11 m/s.

Viscosity Gradient

The rates of change of the viscosity curves were also assessed. These are plotted in FIG. 2. It can be seen that the viscosity gradient decreases as the temperature of the fluid is increased, and that the standard fluids D, E drop below a gradient of 1 at temperatures around 35-40° C. The remaining high viscosity fluids drop below a gradient of 1 at temperatures around 50° C. or higher. In particular, the high viscosity fluids A, B only drop below or reach a viscosity gradient less than 1 near the degradation limit of the fluid.

Ohnesorge Number

The inventors have found a very strong relationship between reliable printing and the Ohnesorge number Oh. The Ohnesorge number is defined as:

where $$Oh = \frac{\eta}{\sqrt{\rho\sigma L}} = \frac{\sqrt{We}}{Re} \sim \frac{\text{viscous forces}}{\sqrt{\text{inertia}\cdot\text{surface tension}}}$$

$\eta$ is the liquid viscosity
$\rho$ is the liquid density
$\sigma$ is the surface tension
L is the characteristic length scale (typically drop diameter)
Re is the Reynolds number
We is the Weber number The Reynolds number is defined as the ratio of the product of fluid density $\rho$, fluid velocity $v$ (in this case the drop velocity upon ejection) and characteristic linear dimension L (in this case the nozzle diameter), and the dynamic viscosity $\eta$ of the fluid:

$$Re = \frac{\rho v L}{\eta}$$

The Weber number We is a ratio of inertia forces and forces resulting from surface tension $\sigma$ of the fluid. It is defined as $$We = \frac{\rho v^2 L}{\sigma}$$

whereas above $\rho$ is fluid density, $v$ is fluid velocity (in this case the drop velocity upon ejection) and L is the characteristic linear dimension (in this case the nozzle diameter).

Ohnesorge numbers for each fluid at different temperatures can therefore be calculated and inputs and numbers are listed in Table 4. The values relate to a droplet ejection velocity of 11 m/s, and length scale L=3.50 $E^{-0.5}$ m for the GS12 nozzle diameter.

TABLE 4

FIG. 3 data

| Fluid | T, ° C. | $\eta_{jetting}$, mPa·s | ρ, g/cm³ | σ, mN/m | Oh | Re | We |
|---|---|---|---|---|---|---|---|
| A | 60 | 97 | 1.1003 | 38.4 | 2.52 | 4.4 | 121.2 |
| A | 67 | 72 | 1.1042 | 37.0 | 1.90 | 5.9 | 126.3 |
| A | 70 | 65 | 1.1058 | 36.4 | 1.73 | 6.6 | 128.5 |
| B | 45 | 126 | 1.0816 | 41.4 | 3.67 | 2.5 | 81.9 |
| B | 56 | 76 | 1.0735 | 40.2 | 1.95 | 5.5 | 113.1 |
| B | 70 | 48 | 1.0623 | 38.5 | 1.28 | 8.5 | 116.9 |
| C | 25 | 95 | 1.0783 | 51.8 | 2.16 | 4.4 | 88.2 |
| D | 45 | 17 | 1.0725 | 21.9 | 0.61 | 23.8 | 207.5 |
| E | 43 | 15 | 1.3429 | 31.3 | 0.38 | 35.7 | 181.9 |
| F | 50 | 58 | 1.0781 | 40.7 | 1.49 | 7.1 | 112.1 |
| F | 55 | 48 | 1.0779 | 40.2 | 1.22 | 8.7 | 113.5 |
| G | 55 | 34 | 1.0752 | 40.5 | 0.88 | 12.0 | 112.5 |
| H | 45 | 66 | 1.0431 | 37.4 | 1.79 | 6.07 | 118.1 |
| K | 27 | 88 | 1.1479 | 33.8 | 2.38 | 5.03 | 144.0 |
| K | 35 | 53 | 1.1422 | 32.9 | 1.47 | 8.25 | 147.0 |

TABLE 4-continued

Figure 3:
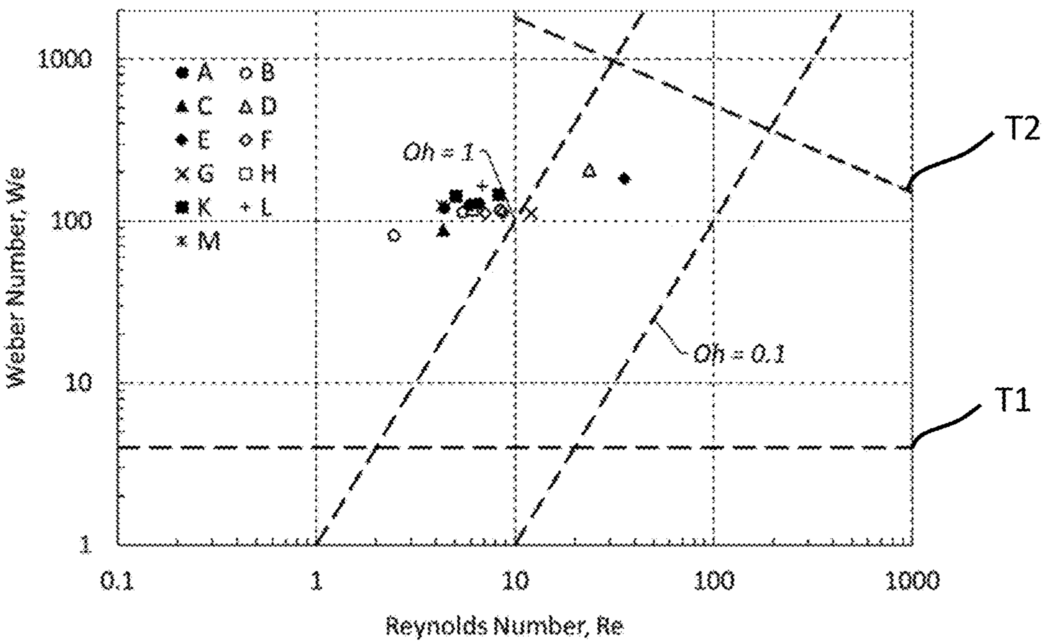
FIG. 3 is a plot of Weber number against Reynolds number for fluids A, B, C, D, E, F, G, H, K, L and M.

| FIG. 3 data | | | | | | | |
|---|---|---|---|---|---|---|---|
| Fluid | T, ° C. | $\eta_{jetting}$, mPa·s | ρ, g/cm$^3$ | σ, mN/m | Oh | Re | We |
| L | 30 | 63 | 1.1131 | 28.5 | 1.88 | 6.86 | 165.3 |
| M | 33 | 98 | 1.0890 | 36.7 | 2.62 | 4.27 | 125.6 |

FIG. 3 is a plot of Weber number We versus Reynolds number Re for fluids A, B, C, D, E, F, G, H, K, L and M. A key to the fluids is found in Table 3. The three data points in the traditionally "good" region, the "printable fluid" region, are standard inkjet inks D, E (Itaca MA5115 and Sunjet ULX5832), and development fluid G of near-standard viscosity of 34 mPa·s. For these three inks, the Ohnesorge number is less than one, Oh<1.

The data points from other successfully jetted fluids are located in the "too viscous" region to the left of the trendline of Oh=1, i.e. for which Oh>1, but all lie above the line indicated by trend line T1, signifying the "insufficient energy for drop formation" region. The trend line T2 represents the onset of "splashing", above which droplets break up into spray. To the right of the trendline Oh=0.1, i.e. for which Oh<0.1, satellites tend to form along with the ejected droplets and print quality deteriorates.

It was found that using the second drive mode (3-Cycle mode) in combination with a low resistance head such as a Xaar 1003 printhead, a range of fluids with Ohnesorge numbers 0.25<Oh<1.75 could be jetted. Using the first drive mode, the high laydown mode, fluid with even higher values of Oh could be jetted, in the range of 0.44<Oh<4. In other examples, fluids with the Ohnesorge numbers in the range of 0.44<Oh<3 or in the range of 0.44<Oh<2.5 may be jetted using the first drive mode.

In some implementations of the droplet deposition apparatus therefore, the fluid properties may be such that the Ohnesorge number of the fluid is greater than 1.5.

Where the droplet deposition apparatus is operated according to a first drive mode (or high laydown mode) as described above, the fluid within the chambers may have a viscosity within a range of 45 mPa·s up to and including 130 mPa·s at a jetting temperature between 20° C. and 90° C. When using the first drive mode, such a fluid may have an Ohnesorge number greater than 0.44 and less than 2.5. In further examples, the fluid may have an Ohnesorge number greater than 0.44 but less than 4 or less than 3. Furthermore, the fluid may preferably have an Ohnesorge number greater than 1.5.

Alternatively, where the droplet deposition apparatus 1 is operated in a second, three cycle, drive mode, the fluid within the chambers 10 may have a viscosity within a range of 45 mPa·s up to and including 65 mPa·s at a jetting temperature between 20° C. and 90° C. For such a fluid, the Ohnesorge number may be greater than 1 and less than 2, and furthermore the fluid may preferably have an Ohnesorge number greater than 1.5 and less than 2.

The first drive mode may have a maximum peak to peak drive voltage lower than that of the second drive mode to eject a droplet of the same velocity. In some implementations, the peak to peak voltage of the drive signal 60 between the first drive mode and the second drive mode may be 10 V for the same fluid at the same jetting viscosity and achieving the same droplet velocity.

Fluid Supply and Droplet Velocity

Fluid may be supplied to and from the printhead 30 via the inlet and return pipes 23, 25 in FIG. 7.

The fluid supply 40 may for example comprise a heater 58 that may heat the fluid to a jetting temperature high enough to lower the viscosity to within a suitable range, for example suitable for the drive mode applied. Additionally, or instead, an onboard heater 59 may be provided onboard the printhead 30 in the vicinity of or at the layer comprising the fluid chambers 10 so as to provide and/or maintain the fluid at a stable jetting temperature.

It was found that when using drive modes such as the first mode, the high actuation rate of the piezoelectric walls 8 can cause significant heating of the walls and therefore of the fluid within the chambers. The actuation rate is typically represented by the duty cycle. The duty cycle represents the percentage of the nozzle ejections per cycle of the printhead. Increasing the duty cycle to eject more droplets means sending an increased number of drive signals to the actuators. This increases the heat generated within the piezoelectric walls 8. This generated heat is dissipated into the fluid in the fluid chambers, thereby heating the fluid and changing its physical properties, such as lowering the viscosity, and the location on the viscosity-temperature curve in FIG. 1.

Going from low duty to high duty generally means that the viscosity of the fluid decreases, which instantaneously changes the Ohnesorge number of the fluid and can change the position of the drop stability due to a shift in the location on the Weber number-Reynolds number plot of FIG. 3. Additionally, a decrease in viscosity increases the droplet velocity and thus can affect the landing position of the droplets, leading to a reduction in print quality.

Without managing or dissipating the heat generated due to the chamber wall actuations, printing reliability can be affected.

Therefore, it is desirable to control the droplet velocity dynamically (i.e. regularly during operation of the head) during changes in duty cycle so as to ensure a reliable print quality. This may be achieved by altering the drive voltage in response to changes in fluid temperature, which alters the droplet velocity. For example, a lower drive voltage reduces the droplet velocity. In addition, the actuating walls are driven less hard and the heat generated by the actuating walls is reduced also. The droplet velocity may be dynamically controlled by using a feedback loop between fluid temperature and drive voltage, the drop velocity, and to some extent the fluid temperature and viscosity, may be actively managed during operation of the printhead.

The power consumed by the drive signal generating circuitry to generate drive signals for the actuating chamber walls may be used as a measure of the heat generated by the actuating chamber walls. As the duty cycle is increased, for example, the current drawn by the drive signal generating circuitry to generate and increased number of drive signals increases. A measurement of the current drawn therefore provides a suitable measure of the effect of heating by the actuating walls on the fluid within the pressure chambers 10, and therefore of the expected increase in droplet velocity as the fluid in the chambers is heated instantaneously upon application of the higher duty cycle signals. Therefore, the current drawn by the drive signal generating circuitry 80 may be measured periodically and provided to the controller 54. The controller determines from the current value a new peak to peak voltage of the drive signal and provides the new value to drive signal generation circuitry 80. The drive signal generation circuitry 80 generates subsequent drive signals (and sub droplet signals) with the new peak to peak voltage, so as to ensure that the droplet velocity remains substantially equal to a predefined value for droplet velocity.

The predefined value for the droplet viscosity is a value previously determined as being suitable for the operation of the droplet deposition apparatus. Preferably, the velocity of the ejected droplets is kept close to or substantially equal to the predetermined droplet velocity so as to ensure reliable printing quality.

If the controller determines a reduced peak to peak voltage is to be applied, the resulting drive signals applying the reduced peak to peak voltage will also reduce the heat generated by the actuating walls and to some degree modify heating effect of the chamber walls on the fluid.

The adjustment of peak to peak voltage in response to the current drawn by the drive signal generation circuitry therefore may to some degree (albeit a lesser, compared to the effect on droplet velocity) be used to control the temperature of the fluid within the pressure chambers 10.

The controller 54 may compare the current value provided by the drive signal generation circuitry 80 to, for example, test data generated previously and stored in the form of a look up table accessible by the controller 54. From the look up table, the controller 54 selects a reduced peak to peak voltage value corresponding to the current value and the predefined droplet voltage, where the new peak to peak voltage has previously been determined in test runs to stabilise the droplet velocity for the new fluid viscosity expected to result from the measured current value. In this way, the droplet velocity remains stable, providing a reliably operating printhead.

In some implementations, the drive signal generation circuitry 80 may be located within the head control circuitry 56 of the printhead 30. In this case, the determination of the modified peak to peak value may be carried out by the head control circuitry on receipt of the measurement of the current drawn by the drive signal generation circuitry 80. The head control circuitry 56 selects a modified peak to peak voltage value corresponding to the current value and the predefined droplet voltage, and provides it to the drive signal generation circuitry 80.

In some implementations of droplet deposition apparatus using recirculating printheads, the return flow of ink may be used to carry away the heat generated by the actuating walls. For example, the feedback loop may exist between the printhead providing a temperature reading of the fluid, and the fluid supply which alters the recirculation rate in response.

The droplet deposition apparatus comprising the low resistance printheads described above when operated with high viscosity fluids may be controlled by various components of a control system of the apparatus. These will now be described with reference to FIG. 13, which is a block diagram of the droplet deposition apparatus 1, and FIG. 14, which is a block diagram of the control system 90 for the droplet deposition apparatus.

Droplet deposition apparatus 1 comprises printhead 30, a user interface 50 such as a PC, a fluid supply 40 and a controller 54. The controller 54 receives image data from the user interface 50 and determines, for each pixel line, pixel clock triggers and sub droplet data for droplets to be ejected from the chambers 10 of the fluid component 20 within printhead 30. The controller supplies pixel clock triggers and sub droplet data to drive signal generation circuitry 80, comprised within the head control circuitry 56 of the printhead 30. The drive signal generating circuitry generates drive signals 60 for each pressure chamber 10 and provides them to the chambers 10(*a*) to 10(*n*) of the fluid component 20 comprised within the printhead 30. The fluid is supplied to the fluid component 20 from the fluid supply 40. The fluid supply 40 comprises a fluid supply controller 52 arranged to adapt the flow rate of fluid through the head, for example to provide a predetermined recirculation flow rate. The fluid supply controller 52 is configured to control pumps (not shown) within the fluid supply in order to apply the required differential pressure between the inlet and return pipes of the printhead 30. The required differential pressure values may be provided to the fluid supply controller 52 by the user interface 50.

More particularly, the control system 90 may comprise a fluid supply controller 52 for controlling a fluid supply configured to supply a fluid to the fluid inlet at a differential pressure as measured between the fluid inlet and the fluid return, wherein the fluid inlet path starts at the fluid inlet into the head, and ends in the one or more nozzles, and wherein the fluid return path starts at the one or more nozzles and ends in the fluid return of the head, and wherein the differential pressure applied by the fluid supply causes a fluid return flow into the fluid return at a rate of between 50 ml/min and 200 ml/min.

The fluid supply 40 may further comprise a heater 58 in thermal contact with the fluid so as to enable it to heat the ink to a predetermined temperature. The heater may be controlled by a heater controller comprised within the fluid supply 40, for example within the fluid supply controller 52. The user interface may provide a value of a predefined temperature to the heater controller that determines the temperature to which the fluid in the fluid supply is to be heated so as to ensure a predefined temperature of the fluid when it enters the pressure chambers 10.

Additionally, or instead, an onboard heater 59 may be provided within the printhead and in close proximity, and thermal contact with, the fluid in the pressure chambers or at a location near the inlets to the pressure chambers. The heater 59 may be controlled by a heater controller comprised within the head control circuitry 56. The user interface 50 may provide, for example via the controller 54, a value of a predefined temperature to the onboard heater controller that determines the amount of heat the heater is to provide so as to ensure a predefined temperature of the fluid inside the pressure chambers 10. The provision of heaters within the flow path of the fluid supports jetting of high viscosity fluids and ensures that they are kept at or above the jetting temperature of the fluid, to provide the fluid at the predefined jetting viscosity.

Figure 13:
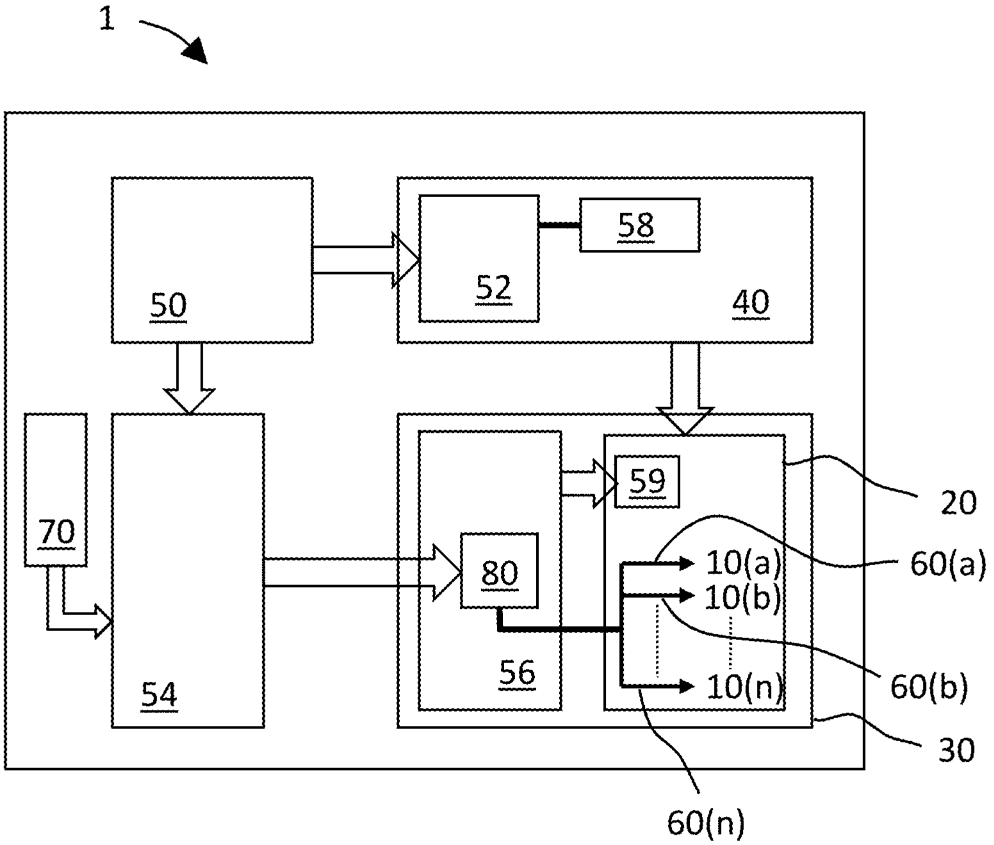
FIG. 13 is a block diagram of the droplet deposition apparatus described herein.

FIG. 13 further shows a media encoder circuitry 70 comprised within the droplet deposition apparatus 1. The media encoder circuitry 70 provides pixel clock signals to the controller 54 to allow the controller to determine the timing, in the form of pixel clock triggers, and therefore correct placement, of droplets into pixel lines on the media. The pixel clock triggers are provided to the drive signal generation circuitry 80 which controls the provision of the drive signals to the actuating walls in response to the pixel clock triggers.

To stabilise the droplet velocity during changes in fluid temperature caused by changes in duty cycle, the droplet deposition apparatus 1 may therefore comprise a drive signal generating circuitry 80, wherein the controller 54 is configured to receive current values consumed by the drive signal generating circuitry 80, and to determine a modified peak to peak voltage of the drive signal 60 in response to the current value so as to modify the droplet velocity of the ejected droplets. The modified peak to peak voltage may then be provided to the drive signal generating circuitry, which generates subsequent drive signals having the modified peak to peak voltage. The drive signal generating circuitry 80 may therefore be configured to receive from the controller 54 the modified peak to peak voltage, and to generate drive signals 60 with the modified peak to peak voltage so as to modify the droplet velocity of the droplets ejected from the one or more nozzles of the one or more fluid chambers of the droplet deposition head. The controller may be further configured to apply the drive signal to the piezoelectric chamber walls such that the nozzle deposits droplets of a fluid having a viscosity in the range from 45 mPa·s to 130 mPa·s at the predefined jetting temperature between 20° C. and 90° C.

In some implementations, the drive signal generating circuitry 80 may be comprised within a head control circuit 56. Furthermore, instead of the controller 54, the head control circuit 56 may be configured to receive current values consumed by the drive signal generating circuitry 80, and to determine a modified peak to peak voltage of the drive signal 60 in response to the current value so as to modify the droplet velocity of the ejected droplets. The modified peak to peak voltage may then be provided to the waveform generating circuitry 80, which generates subsequent drive signals 60 having the modified peak to peak voltage.

Furthermore, a method for operating the droplet deposition apparatus 1 is provided. The method comprises the steps of (i) supplying fluid to the fluid chambers 10 of the droplet deposition head 30 so as to cause a recirculation flow of fluid through each chamber 10 at a rate of between 50 ml/min and 200 ml/min; (ii) providing heating to the fluid before and/or after suppling the fluid to the fluid inlet 23 of the head, such that the fluid in the fluid chambers 10 is at a predefined jetting temperature of between 20° C. and 90° C. and corresponding to a viscosity in the range from 45 mPa·s to 130 mPa·s; and (iii) applying a drive signal 60 to the piezoelectric walls 8 of one or more of the chambers so as to eject some of the fluid supplied to the chambers in the form of one or more droplets, and returning excess fluid supplied to the chamber but not ejected to the fluid return 25 of the head 30 at a rate of between 50 ml/min and 200 ml/min.

The method may further comprise the step of providing to the controller 56 of the droplet deposition apparatus 1 a current signal based on the duty cycle of actuations of the chamber walls 8, wherein the controller 54, 56 determines a modified peak to peak voltage of the drive signal 60 in response to the current value so as to keep the droplet velocity of the ejected droplets substantially equal to the predefined droplet velocity. To avoid visible defects in the print reliability, the droplet velocity may be kept to within +/−1 V of the predefined droplet velocity.

The method may further comprise the step of heating the fluid in the fluid supply 40 so that the heated fluid arriving at the fluid chambers 10 is substantially equal to the predefined jetting temperature.

Alternatively, or instead, the method may further comprise the step of heating the fluid onboard the droplet deposition head 30 so that the heated fluid arriving at the fluid chambers 10 is substantially equal to the predefined temperature.

To avoid visible defects in the print reliability, the jetting temperature may be kept to within +/−1° C. of the predefined temperature. In some implementations, the jetting temperature may be kept to within +/−0.5° C. of the predefined temperature.

The methods may be carried out by the control system 90 of the droplet deposition apparatus 1. A block diagram of the control system in shown in FIG. 14. The control system 90 comprises a controller 54 and a drive signal generating circuitry 80. The controller 54 is configured to receive the predefined droplet velocity and current values 92 from the drive signal generation circuitry 80, and to determine, based on stored test data, a modified peak to peak voltage in response to the current value and the predefined droplet velocity. The drive signal generating circuitry 80 is configured to receive the modified peak to peak voltage and to generate drive signals 60 with the modified peak to peak voltage 94, such that the generated drive signals 60 modify the droplet velocity of the ejected droplets. The generated drive signals 60 may modify the droplet velocity so that it is substantially equal to the predefined droplet velocity. To avoid visible defects in the print reliability, the droplet velocity may be kept to within +/−1 V of the predefined droplet velocity.

Figure 14:
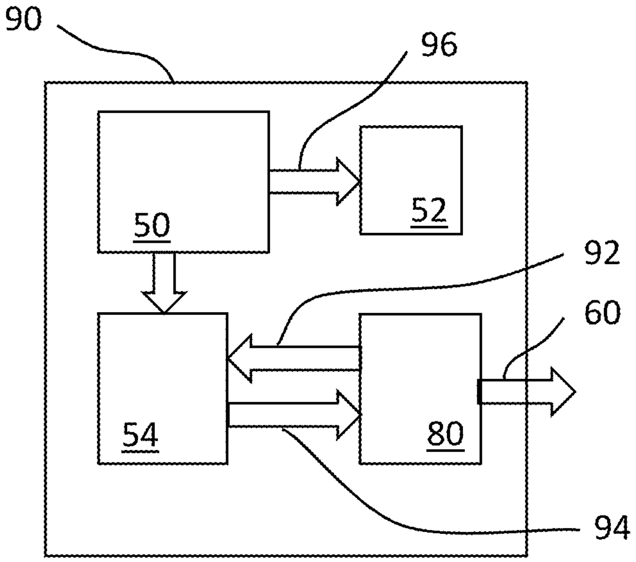
FIG. 14 is a block diagram of a control system for the droplet deposition apparatus described herein.

In the embodiment shown in the block diagram of FIG. 14, the drive signal generating circuitry 80 may be onboard the printhead, although this is not essential.

In an alternative embodiment of the control system, the function of the controller 54 described above may be carried out instead by the head control circuitry 56, and an identical block diagram with controller 56 replacing controller 54 may be envisaged.

In some implementations, the control system may further comprise a heater 58, 59 and a heater controller 57, wherein the heater is configured to heat the fluid provided to the chambers 10, and the heater controller 57 is configured to receive operating data 96 from the controller 56, wherein the operating data is based on the predefined droplet velocity and the current value 92 of the drive signal generation circuitry 80, and wherein the heater controller 57 is further configured to control the heater based on the operating data 96 so as to heat the fluid in the chambers to substantially the predefined jetting temperature. The heater 58 may be located within the fluid supply 40, and the heater controller 57 may be comprised within the fluid supply controller 52. Additionally, or instead, the heater 59 may be located onboard the printhead 30, and the heater controller 57 may be comprised within the head control circuitry 56 of the printhead.

In some implementations, the drive signal generating circuitry 80 may be comprised within the head control circuitry 56. In other implementations, the drive signal generating circuitry 80 may be comprised within the controller 54.

It should be understood that references above and herein to droplet deposition apparatus comprise inkjet printers and references to droplet deposition heads comprise inkjet printheads. To avoid visible defects in the print reliability, the droplet velocity may be kept to within +/−1 V of the predefined droplet velocity. Additionally, or instead, the jetting temperature may be kept to within +/−1° C. of the predefined temperature, and in some implementations, the jetting temperature may be kept to within +/−0.5° C. of the predefined temperature.

In some implementations, the peak to peak voltage of the drive signal between the first drive mode and the second drive mode may be 10 V for the same fluid at the same jetting viscosity and achieving the same droplet velocity.

The present disclosure also provides a droplet deposition apparatus comprising a droplet deposition head, a fluid supply and a controller, wherein: the droplet deposition head comprises one or more fluid chambers each having a nozzle, a fluid inlet path having a fluid inlet into the head, and ending in the one or more nozzles, and a fluid return path starting at the one or more nozzles and ending in a fluid return of the head; each fluid chamber comprises two opposing chamber walls comprising piezoelectric material and deformable upon application of an electric drive signal so as to eject a fluid droplet from the nozzle; the fluid supply is configured to supply a fluid to the fluid inlet at a differential pressure as measured between the fluid inlet and the fluid return; and the controller is configured to apply a drive signal to the piezoelectric chamber walls such that the nozzle or nozzles deposit droplets of a fluid having a viscosity in the range from 45 mPa·s to 120 mPa·s at a jetting temperature between 20° C. and 90° C., and wherein the differential pressure applied by the fluid supply causes a fluid return flow into the fluid return at a rate of between 50 ml/min and 200 ml/min. Optional or preferable features of such a droplet deposition apparatus are as described in relation to the embodiments above.

Also provided is a method for operating such a droplet deposition apparatus, the method comprising the steps of: supplying fluid to the fluid chambers of the droplet deposition head so as to cause a recirculation flow of fluid through each chamber at a rate greater than the ejection rate; providing heating to the fluid before and/or after suppling the fluid to the fluid inlet of the head, such that the fluid in the fluid chambers is at a predefined jetting temperature and corresponding to a viscosity in the range from 45 mPa·s to 120 mPa·s; and applying a drive signal to the piezoelectric walls of one or more of the chambers so as to eject some of the fluid supplied to the chambers in the form of one or more droplets, and returning excess fluid supplied to the chamber but not ejected to the fluid return of the head. Optional or preferable features of such a method are as described in relation to the embodiments above. A control system for carrying out such a method is also provided.

The invention claimed is:

1. A droplet deposition apparatus comprising a droplet deposition head, a fluid supply, a controller, and drive signal generating circuitry, wherein:

the droplet deposition head comprises one or more fluid chambers each having a nozzle defined in a nozzle plate common to each of the nozzles of the droplet deposition head, a fluid inlet path having a fluid inlet into the head, and ending in the one or more nozzles, and a fluid return path starting at the one or more nozzles and ending in a fluid return of the head;

each fluid chamber comprises two opposing chamber walls comprising piezoelectric material and deformable upon application of an electric drive signal so as to eject a fluid droplet from the nozzle; and the fluid supply is configured to supply a fluid to the fluid inlet at a differential pressure as measured between the fluid inlet of the droplet deposition head and the fluid return of the droplet deposition head;

wherein the controller is configured to apply drive signals to the piezoelectric chamber walls such that the nozzle or nozzles deposit droplets of a fluid having a viscosity in the range from 45 mPa·s to 130 mPa·s at a predefined jetting temperature between 20° C. and 90° C.;

wherein the drive signal generating circuitry is configured to modify the drive signals to control droplet velocity during changes in chamber wall actuation rate so as to keep the droplet velocity of the ejected droplets substantially equal to a predefined droplet velocity;

and wherein the differential pressure applied by the fluid supply maintains a fluid return flow into the fluid return of the droplet deposition head at a rate of between 50 ml/min and 200 ml/min.

2. The droplet deposition apparatus according to claim 1, wherein the fluid supply is configured to heat the fluid to the respective temperature in the range of 20° ° C. to 90° C. and to provide the heated fluid to the fluid inlet at the corresponding viscosity of 45 mPa·s to 130 mPa·s.

3. The droplet deposition apparatus according to claim 1, wherein the droplet deposition head further comprises a heater configured to heat the fluid to jetting temperature.

4. The droplet deposition apparatus according to claim 1, wherein the fluid has a viscosity at 30° C. lying in a range of 60 mPa·s to 660 mPa·s.

5. The droplet deposition apparatus according to claim 1, configured such that a fluid resistance between the fluid inlet and the fluid return is equal to or lower than 800 mbar/(ml·min) per fluid chamber.

6. The droplet deposition apparatus according to claim 1, wherein a maximum peak to peak voltage of the drive signal is less than or equal to 35 V to eject a droplet of a volume between 7 to 120 pl at a droplet ejection velocity of 11 m/s.

7. The droplet deposition apparatus according to claim 1, wherein the fluid having a viscosity in the range from 45 mPa·s to 130 mPa·s at the predefined jetting temperature has an Ohnesorge number greater than 1.5.

8. The droplet deposition apparatus according to claim 1, wherein the drive signals are applied according to a first, high laydown, drive mode and the apparatus is configured such that the fluid within the chambers has a viscosity within the range of 45 mPa·s up to and including 130 mPa·s at a jetting temperature between 20° C. and 90° C.

9. The droplet deposition apparatus according to claim 8, configured to deposit droplets of fluid having an Ohnesorge number greater than 0.44 and less than 4.

10. The droplet deposition apparatus according to claim 9, configured to deposit droplets of fluid having an Ohnesorge number greater than 0.44 and less than 2.5.

11. The droplet deposition apparatus according to claim 9, configured to deposit droplets of fluid having an Ohnesorge number greater than 1.5.

12. The droplet deposition apparatus according to claim 1, wherein the drive signals are applied according to a second, three cycle, drive mode and the apparatus is configured such that the fluid within the chambers has a viscosity value within the range of 45 mPa·s up to and including 65 mPa·s at a jetting temperature between 20° C. and 90° C.

13. The droplet deposition apparatus according to claim 12, configured to deposit droplets of fluid having an Ohnesorge number greater than 1 and less than 2.

14. The droplet deposition apparatus according to claim 13, configured to deposit droplets of fluid having an Ohnesorge number greater than 1.5.

15. The droplet deposition apparatus according to claim 1, wherein the head further comprises the drive signal generating circuitry, wherein the controller is configured to receive current values consumed by the drive signal generating circuitry, and to determine a modified peak to peak voltage of the drive signal in response to the current value so as to modify the droplet velocity of the ejected droplets.

16. The droplet deposition apparatus according to claim 15, wherein the drive signal generating circuitry is configured to receive from the controller the modified peak to peak voltage, and to generate drive signals with the modified peak to peak voltage so as to modify the droplet velocity of the ejected droplets.

17. The droplet deposition apparatus according to claim 1, wherein a first drive mode has a maximum peak to peak drive voltage lower than that of a second drive mode to eject a droplet of the same velocity.

18. A method for operating the droplet deposition apparatus of claim 1, the method comprising the steps of:

supplying fluid to the fluid chambers of the droplet deposition head so as to maintain a recirculation flow of fluid through each chamber at a rate of between 50 ml/min and 200 ml/min;

providing heating to the fluid before and/or after suppling the fluid to the fluid inlet of the head, such that the fluid in the fluid chambers is at a predefined jetting temperature of between 20° C. and 90° C. and corresponding to a viscosity in the range from 45 mPa·s to 130 mPa·s; and applying drive signals to the piezoelectric walls of one or more of the chambers so as to eject some of the fluid supplied to the chambers in the form of one or more droplets having a viscosity in the range from 45 mPa·s to 130 mPa·s at a jetting temperature between 20° C. and 90° C., and returning excess fluid supplied to the chamber but not ejected to the fluid return of the head at a rate of between 50 ml/min and 200 ml/min;

wherein the drive signals are modified to control droplet velocity during changes in the chamber wall actuation rate so as to keep the droplet velocity of the ejected droplets substantially equal to the predefined droplet velocity.

19. The method according to claim 18, the method further comprising providing from the drive signal generating circuitry to the controller a current signal based on a duty cycle of actuations of the chamber walls, wherein the controller adjusts a peak to peak voltage of the drive signal in response to a current value so as to keep the droplet velocity of the ejected droplets substantially equal to the predefined droplet velocity.

20. A control system for carrying out the method according to claim 1, the control system comprising a controller and drive signal generating circuitry, wherein the controller is configured to receive the predefined droplet velocity and current values from the drive signal generation circuitry, and to determine, based on stored test data, a modified peak to peak voltage in response to the current value and the predefined droplet velocity; and wherein the drive signal generating circuitry is configured to receive the modified peak to peak voltage and generate drive signals with the modified peak to peak voltage, such that the generated drive signals modify the droplet velocity of the droplets ejected from the one or more nozzles of the one or more fluid chambers of the droplet deposition head so as to keep the droplet velocity of the ejected droplets substantially equal to the predefined droplet velocity, and wherein the controller is further configured to apply the drive signal to the piezoelectric chamber walls such that the nozzle deposits droplets of a fluid having a viscosity in the range from 45 mPa·s to 130 mPa·s at the predefined jetting temperature between 20° C. and 90° C.

21. The control system according to claim 20, further comprising a heater and a heater controller, wherein the heater is configured to heat the fluid provided to the chambers, and the heater controller is configured to receive operating data from the controller, wherein the operating data is based on the predefined droplet velocity and the current value of the drive signal generation circuitry, the heater controller further configured to control the heater based on the operating data so as to heat the fluid in the chambers to substantially the predefined jetting temperature.

22. The control system according to claim 21, wherein the heater is located onboard the printhead and the heater controller is comprised within the head control circuitry of the printhead.

23. The control system according to claim 20, further comprising a fluid supply controller for controlling a fluid supply configured to supply a fluid to the fluid inlet at a differential pressure as measured between the fluid inlet and the fluid return, wherein the fluid inlet path starts at the fluid inlet into the head, and ends in the one or more nozzles, and wherein the fluid return path starts at the one or more nozzles and ends in the fluid return of the head, and wherein the differential pressure applied by the fluid supply maintains a fluid return flow into the fluid return at a rate of between 50 ml/min and 200 ml/min.

* * * * *